United States Patent [19]

Bocast

[11] Patent Number: 5,008,818

[45] Date of Patent: Apr. 16, 1991

[54] METHOD AND APPARATUS FOR RECONSTRUCTING A TOKEN FROM A TOKEN FRAGMENT

[75] Inventor: Alexander K. Bocast, 2206 S. Dinwiddie St., Arlington, Va. 22206

[73] Assignee: Alexander K. Bocast, Arlington, Va.

[21] Appl. No.: 342,085

[22] Filed: Apr. 24, 1989

[51] Int. Cl.[5] ............................................. G06F 15/20
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,092,729 | 5/1978 | Rosenbaum et al. | 364/900 |
| 4,290,105 | 9/1981 | Cichelli et al. | 364/200 |
| 4,290,115 | 9/1981 | Pitt et al. | 364/900 |
| 4,314,356 | 2/1982 | Scarbrough | 364/900 |
| 4,328,561 | 5/1982 | Convis et al. | 364/900 |
| 4,355,371 | 10/1982 | Convis et al. | 364/900 |
| 4,438,505 | 3/1984 | Yanagiuchi et al. | 364/900 |
| 4,450,520 | 5/1984 | Hollaar et al. | 364/200 |
| 4,453,217 | 6/1984 | Boivie | 364/300 |
| 4,471,459 | 9/1984 | Dickinson et al. | 364/900 |
| 4,490,811 | 12/1984 | Yianilos et al. | 364/900 |
| 4,498,148 | 2/1985 | Glickman | 364/900 |
| 4,499,553 | 2/1985 | Dickinson et al. | 364/900 |
| 4,503,514 | 3/1985 | Urquhart | 364/900 |
| 4,556,951 | 12/1985 | Dickman et al. | 364/900 |
| 4,625,295 | 11/1986 | Skinner | 364/900 |
| 4,689,743 | 8/1987 | Chiu | 364/419 |
| 4,689,768 | 8/1987 | Heard et al. | 364/900 |
| 4,694,420 | 9/1987 | Pettet et al. | 364/900 |
| 4,760,523 | 7/1988 | Yu et al. | 364/200 |

OTHER PUBLICATIONS

Communications of the ACM, Nov. 1964, "An Inductive Approach to Language Translation", by R. D. Faulk.

Computing Surveys, vol. 12, No. 4, Dec. 1980, at pp. 381–402, "Approximate String Matching", by Hall and Dowling.

AI Expert, Jul. 1988, "Fuzzy DATA Retrieval", by Roy E. Kimbrell.

Dr. Dobb's Journal of Software Tools, Jul. 1988, "Pattern Matching: The Gestalt Approach".

Primary Examiner—Thomas M. Heckler
Attorney, Agent, or Firm—Banner, Birch, McKie & Beckett

[57] ABSTRACT

A method and apparatus for reconstructing a token from a token fragment (unreconstructed token) wherein at least two indices for an unreconstructed string and three indices for a vocabulary string are iteratively calculated and recorded. Each string has associated with it two indices that record distance moved by successful character comparisons from either end of the strings. In addition, the vocabulary string also has an index that points to the last character in the vocabulary string that was successfully matched to a character in the unreconstructed string during the first comparison step with respect to the initial end of the strings. The strings are compared with respect to one end of the strings, at least one of the indices moves away from the initially selected end of the strings, both pointing to a character of the unreconstructed string and measuring the distance into a string that was traversed by a series of successful character comparisons from the end of the string at which the initial comparison step began. Furthermore, the second calculating and recording step, performed with respect to the opposite end of the strings, is bypassed if all the characters of the token fragment are accounted for in the vocabulary string. If not bypassed, the strings are compared with respect to the opposite end of the strings. A fuzziness factor is input that controls admission of vocabulary strings to the function that computes a non-zero reconstruction index requiring only the calculated and recorded indices.

21 Claims, 15 Drawing Sheets

Microfiche Appendix Included
(1 Microfiche, 37 Pages)

COPYRIGHT 1988 ALEXANDER K BOCAST

COPYRIGHT 1988 ALEXANDER K BOCAST

COPYRIGHT 1988 ALEXANDER K BOCAST

COPYRIGHT 1988 ALEXANDER K BOCAST

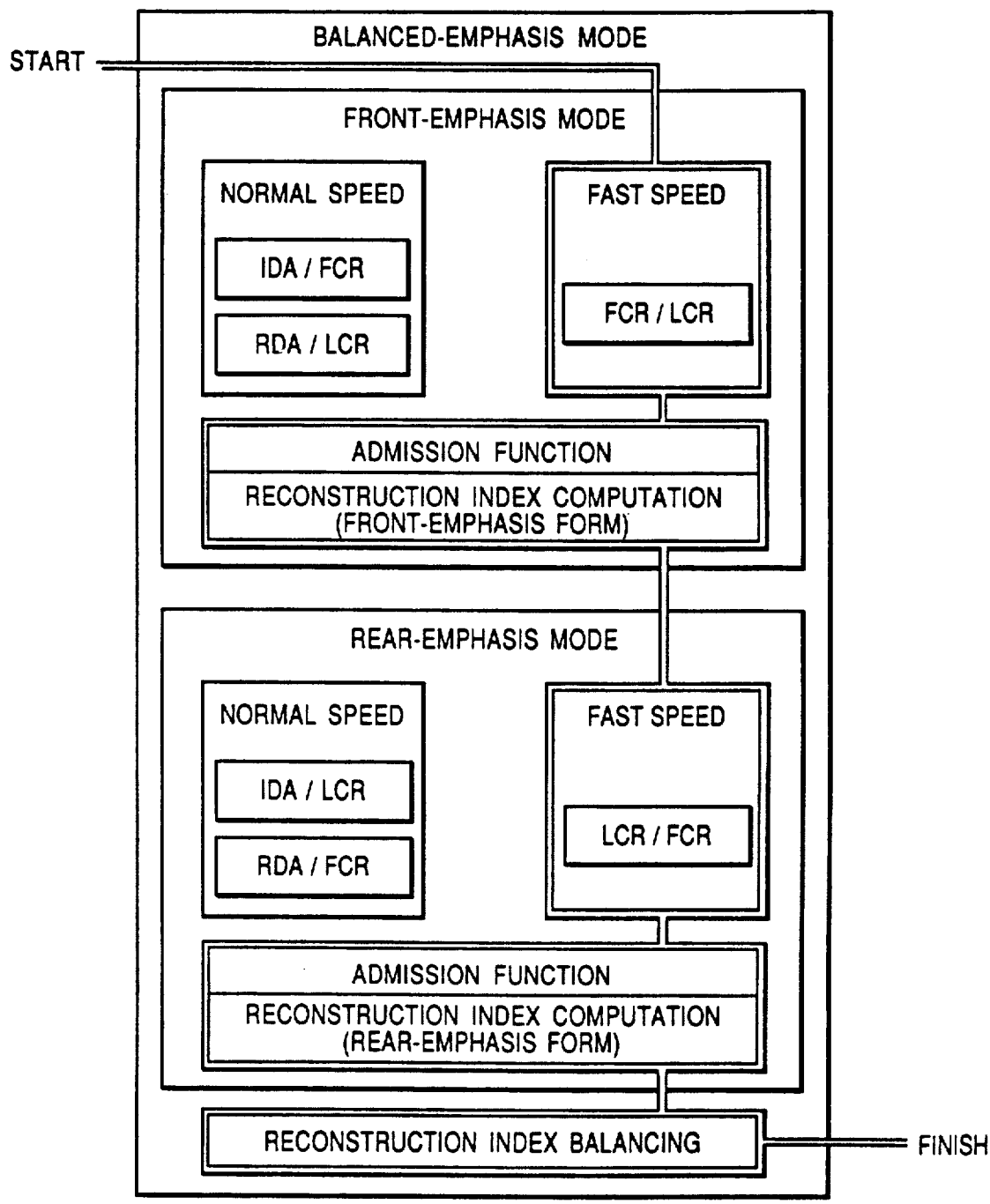

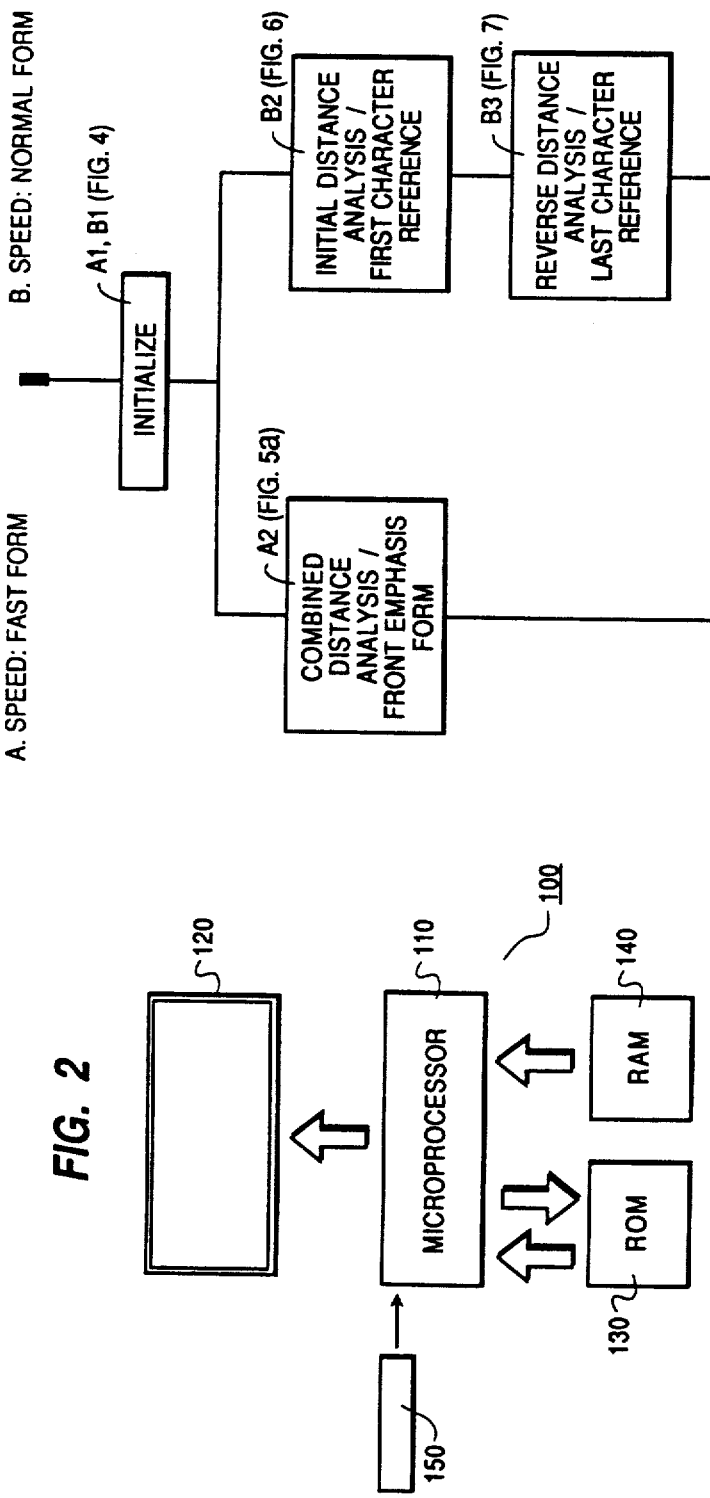

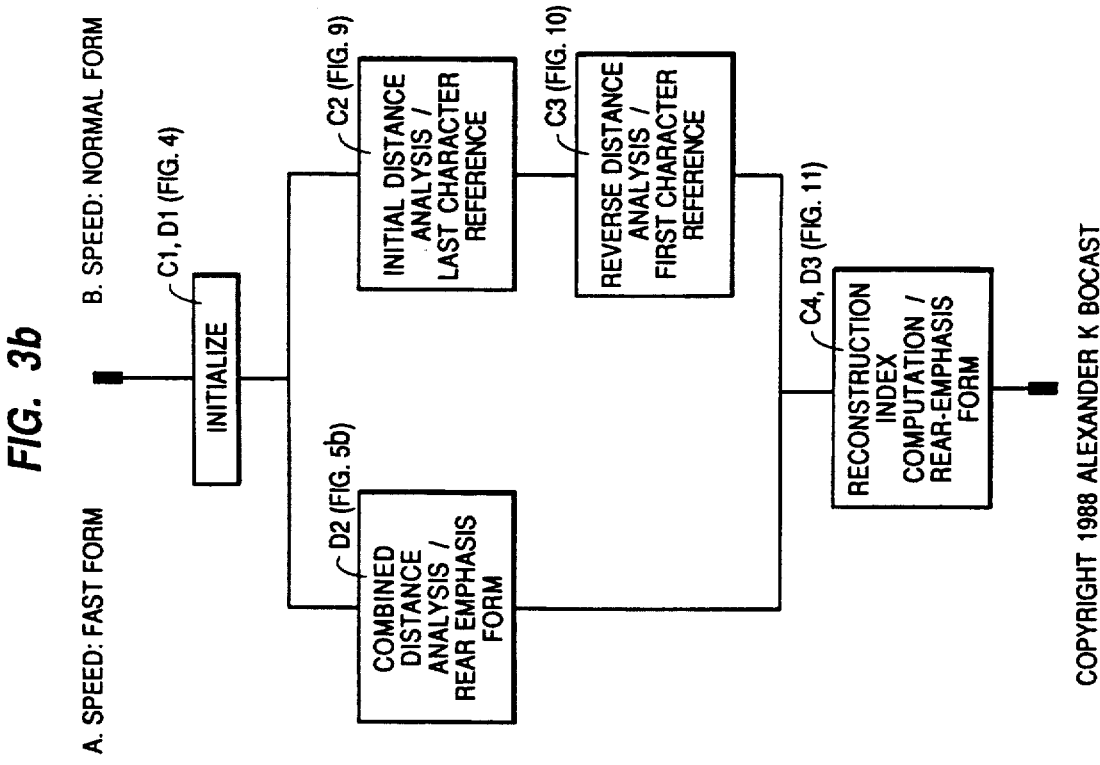

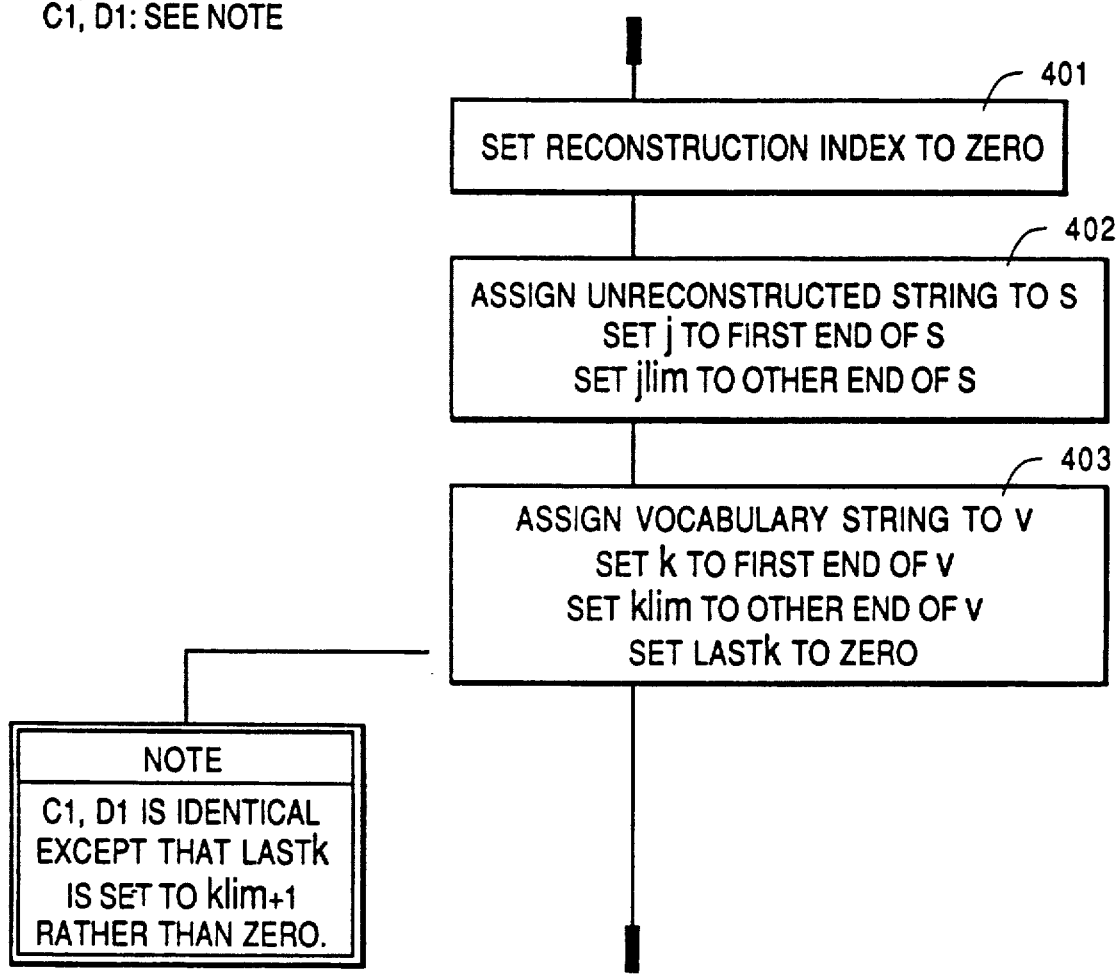

COPYRIGHT 1988 ALEXANDER K BOCAST

COPYRIGHT 1988 ALEXANDER K BOCAST

COPYRIGHT 1988 ALEXANDER K BOCAST

COPYRIGHT 1988 ALEXANDER K BOCAST

COPYRIGHT 1988 ALEXANDER K BOCAST

COPYRIGHT 1988 ALEXANDER K BOCAST

METHOD AND APPARATUS FOR RECONSTRUCTING A TOKEN FROM A TOKEN FRAGMENT

This application comprises a microfiche appendix of 1 microfiche including 37 frames of computer program source and command language listings for which protection under all applicable copyright laws is asserted.

BACKGROUND OF THE INVENTION

1. Technical Field

This invention relates generally to the field of language processing systems and, more particularly, to a method and apparatus for reconstructing a token from a token fragment, a token being a string of characters or symbols having meaning in a language of a language processing system.

2. Description of the Relevant Art

The problem solved by the principles underlying the present invention has its roots in information theory. A message having information content may be corrupted by noise or other adverse influences on the tokens from which the message may be constructed. A particular token may be practically unrecognizable once subjected to character or symbol deletion, addition, substitution, or transposition. The token may be even intentionally abbreviated or truncated to a fragment which is no longer recognizable.

Two characteristics of the problem are that:

(1) between the point at which a message originates and the point at which the message is received and analyzed, tokens may be corrupted into fragments that are typically shorter than the original tokens by a variety of causes, some of which are: electromechanical corruption caused by transmission system noise, truncation, or dropped bits; human corruption caused by mistyping, misspelling, or the use of arbitrary abbreviations; and (2) messages of a given language follow syntactic conventions and use constrained vocabularies, i.e., the number of tokens that may be used at any given point within a message is limited. Command languages for computer systems are one example of language systems that possess these characteristics. Formatted military messages are another example.

The analysis at a receiver must remove corruption by reconstructing any corrupted tokens and by substituting the reconstructed tokens for the corrupted tokens in the message. This differs from the problem addressed by spelling checkers in that a single reconstructed token must be output, not a number of choices. In other words, a spelling checker need only test for membership of a string within a set of correctly-spelled strings. The present problem also differs from the problem addressed by spelling correction mechanisms in its assumptions: a spelling correction mechanism assumes the input string is complete, with or without spelling or typographic errors, while this invention makes no assumptions concerning the correctness or completeness of the input string. (For example, because such mechanisms assume completeness, they can not reliably reconstruct from arbitrary abbreviations formed by random character deletions.)

The present invention also addresses certain limitations of the current art of command language processing for real-time control systems. To ensure recognition of input tokens that are true elements of a command statement, current command language processors must do at least one of the following:

(1) force entry of complete, totally correct, and unambiguous tokens;

(2) limit commands to one or two keystrokes that may be arbitrarily mnemonic at best to avoid ambiguity, e.g., 'E' is for Edit while 'X' is for execute; or (3) force the application of a well-defined, non-arbitrary abbreviation scheme, for example, least-unambiguous truncation, which, like complete tokens, requires totally correct entry.

Other expressions of the present problem are data compression and expansion or data encryption and decryption. Data may be intentionally compressed for transmission, for example, for the purposes of accomplishing transmission within limited bandwidth. Also, data may be intentionally encrypted for transmission to avoid understanding except by those for whom the data are intended.

In addition, algorithms are known which are capable of searching an extensive set of records for a match with a string of characters or symbols in combination or within a predetermined proximity of other input strings. Such algorithms are applied in the art of information retrieval to identify, for example, citations to publications which may be of interest, from searching abstracts or full texts of the publications. They are related to a different but related problem than the problem of token reconstruction although token reconstruction may be applied to advantage in editing an information retrieval query.

To reconstruct and substitute tokens for token fragments according to the present invention, it is not only necessary to identify possible reconstructions from a given set of tokens, called the "vocabulary", for the unreconstructed token, but to identify which of the vocabulary tokens is the most likely reconstruction by computing a "reconstruction index" to measure the relative likelihood that a given vocabulary token is a correct reconstruction of the original input unreconstructed token.

In an article entitled "An Inductive Approach to Language Translation," published in the *Communications of the ACM*, November 1964, R. D. Faulk suggested three different measures of similarity: material, ordinal, and positional similarity. Material similarity relates to the extent of character matches between two strings. Ordinal similarity relates to the extent to which characters in two strings appear in the same order. Positional similarity relates to the extent to which characters in two strings are located at the same position. Faulk suggests that a total similarity function or scoring may result from a normalized combination of these three functions, by weighting each of these functions at a value of one third.

Early methodology for matching fragments to candidates is exemplified by the publications of A. J. Szanser on pattern recognition, error correction, and elastic matching techniques. Generally, Szanser suggests the steps of quickly extracting all non-identical versions of a fragment string from a candidate list and then using bracketing techniques to reduce operational time. The developmental efforts of Szanser and others through 1980 are discussed in some detail in Hall and Dowling's article "Approximate String Matching," *Computing Surveys*, Vol. 12, No. 4, December 1980, at pages 381–402.

A commercially available software package from Proximity Technology Inc. is described in part by U.S. Pat. No. 4,490,811 which was issued to Yianilos et al. Dec. 25, 1984. Yianilos el al. discloses a string comparator device system circuit and method involving, as do most algorithms in the art, a forward scan and reverse scan of an input string. The Yianilos method computes a measure of symmetric similarity between two strings. Consequently, the method may result in reconstruction by substitution of a symmetrically most similar substitute.

The Yianilos method is particularly well suited for spelling correction for large, unstructured vocabularies. However, the method of string comparison disclosed by Yianilos is computationally complex and hence very slow. Further, because the disclosed method computes a symmetric similarity measure rather than an asymmetric reconstruction index, it does not adequately or efficiently handle the problem of arbitrarily dropped characters and hence provides no general solution for the problem of abbreviations or truncations. Further, the method provides no means to interject or to vary fuzziness criteria, for example, as defined by R. E. Kimbrell.

As used in the art, the term "fuzziness" is taken from the mathematical study of fuzzy sets, as explained by R. E. Kimbrell in his article "Fuzzy Data Retrieval", *AI Expert*, July, 1988, at pages 56–63. In classical set theory, an item either is or is not a member of a set; a test for membership in a set evaluates to either true or false, a binary or boolean result. Fuzzy set theory admits uncertainty about membership in a set. For example, if members of set A are blue, round, and large while members of set B are red, square, and small, into which set does an item Q characterized as blue, round, and small go? Fuzzy set theory would allow analysis to be not binary, suggesting that there is a ⅔ chance that Q is a member of set A and a ⅓ chance that Q is a member of set B. In other words, Q is similar to both A and B in some respects, but overall Q is more similar to A, but the exact assignment of Q to set A or B is fuzzy or not clear.

Similarly, in ordinary string comparison approaches, a string (or substring) either is or is not exactly the same as another string (or substring). In contrast, a fuzzy string comparison algorithm evaluates how much one string is like another when the strings are not exactly alike; this is called a fuzzy comparison. A fuzzy comparison gives an ambiguous truth value, somewhere between true and false, between 0.00 and 1.00.

In the prior art, there is no fuzziness criteria or control over how much one string must resemble another string; fuzziness evaluation is a given, fixed attribute of the algorithm used to compare two strings.

Consequently, there remains a requirement in the art for a flexible, fast, and efficient algorithm and apparatus for token reconstruction which permits the user or system designer to adapt its application to specific vocabulary problems by changing input and/or output criteria, in particular by changing fuzziness criteria.

SUMMARY OF THE INVENTION

The above-stated problems and related problems of known methods and apparatus for string comparison are solved with the principles of the present invention, a method of token reconstruction involving fewer steps than prior art algorithms yet providing improved flexibility in application.

Token Reconstruction Algorithm

The present algorithm for token reconstruction requires as input two strings or tokens (the terms "string" and "token" are used interchangeably in this disclosure) and a single control parameter, called the "fuzziness factor". The first input string is called the "unreconstructed string" while the second input string is called the "vocabulary string". The fuzziness factor determines how different an unreconstructed string and a vocabulary string may be before the vocabulary string will be rejected as a possible reconstruction of the unreconstructed string.

The algorithm presents as output a value referred to as the "reconstruction index". The reconstruction index is the relative likelihood that the vocabulary string is a correct reconstruction of the unreconstructed string.

Note that the reconstruction index is not a measure of the similarity of the two strings because the reconstruction index is not symmetric with respect to the ordering of the input strings. Reversing the order of the two input strings will generate different reconstruction indexes for each ordering. The reconstruction index describes the vocabulary string with respect to the unreconstructed string, not the joint pairing of the two input strings as is the case with all known measures of similarity. Specifically, and in contrast to other algorithms, the present invention attempts to find characters of the vocabulary string in the unreconstructed string.

The present algorithm first seeks the position of the first character in the unreconstructed string that does not match, in order, a character in the vocabulary string, with respect to one end of these strings. Secondly, the algorithm seeks the first character in the unreconstructed string that does not match, in order, a character in the vocabulary string, with respect to the other end of the vocabulary string. These steps operate with the constraint that any characters once matched will not be examined again. This means that the analysis will be intentionally terminated in the event that all characters or symbols of the unreconstructed string are accounted for in the reference vocabulary string, either in the first or the second step.

The position of the last character examined in both strings and in both steps is retained by the same pointers that control the search for the non-matching characters. In particular, these pointers will never point to a character that has been matched in the step with which they are associated.

A surprising virtue of the method of this invention is implied in the above discussion. Unlike symmetric similarity algorithms, such as the Yianilos invention cited above, the method of token reconstruction does not require that the strings being compared must be scanned. In such similarity algorithms each and every character in both strings under comparison must be examined; for greater fidelity, each and every character in both strings must be examined at least twice by similarity algorithms: first via forward scanning from the front of the strings and a second time via backward scanning from the end of the strings. The asymmetric method of token reconstruction levies no such computationally expensive requirement.

Only as many characters as are needed to carry the analysis forward are examined by the asymmetric token reconstruction method. In many cases, the present algorithm need only consider the first character and the last character of the unreconstructed string to determine that the vocabulary string cannot be a candidate reconstruction; in this case, the number of character comparisons is 2·m, where m is the number of characters in the vocabulary string and is independent of the number of characters in the unreconstructed string. As a rule of thumb, the more often the character comparisons result in matches, the smaller the absolute number of character comparisons made by the present token reconstruction method. When the unreconstructed string and the vocabulary string are exactly identical, the number of character comparisons is simply m. When the unreconstructed string is of length n and the vocabulary string is of length m and the unreconstructed string is a strict abbreviation of the vocabulary string (i.e., formed by character deletion), the number of character comparisons may be as few as n and will never exceed m; the number of characters actually examined in the vocabulary token will also be between n and m. This is in sharp contrast to symmetric similarity methods which require complete forward and/or backward scans of all characters in both strings, as a consequence of the symmetric nature of those algorithms.

In the third step, these pointers, when compared to pointers to the origin of each string, as established in the first step, give the distance of the unmatched character(s) from that origin. The simple arithmetic ratio of the sum of these distances, the sums being taken with respect to the pair of pointer distances for each string, is the relative likelihood that the vocabulary string is a correct reconstruction of the unreconstructed string. This is the "reconstruction index" as defined above and the vocabulary string for which a reconstruction index is computed is a "candidate reconstruction".

A reconstruction index is computed for a vocabulary string only when the pointers associated with the unreconstructed string pass an "admission function" that incorporates the fuzziness factor. The admission function, using the fuzziness factor, governs how closely the vocabulary string must resemble the unreconstructed string before it may be admitted as a candidate reconstruction.

This use of the fuzziness factor further distinguishes the current method from the prior art. As explained previously, known symmetric similarity methods compute a fuzzy comparison between two strings; fuzziness in the prior art simply means that the computed measure of similarity falls between 0.00 and 1.00, i.e. "fuzzily" between the discrete evaluations of true or false. The degree of fuzziness with prior art algorithms is fixed and inherent in the scoring algorithms of those methods; such algorithms do not have a parameter like the fuzziness factor of the current method.

In contrast, while the current method is a fuzzy method in that the computed reconstruction index falls between 0.00 and 1.00, representing the relative likelihood that the vocabulary word is a reconstruction of the input unreconstructed string, the fuzziness factor of the current method allows the degree of fuzziness to be varied, i.e., as a parameter of the algorithm, the fuzziness factor allows the user or designer to tighten or to loosen the comparison criteria for judging the vocabulary string to be a reconstruction of the input unreconstructed string, prior to computation of the reconstruction index itself. As the fuzziness factor value decreases, reconstruction indexes will be computed for fewer vocabulary strings because fewer vocabulary strings will pass the admission function. This is because as the fuzziness factor value decreases, vocabulary strings must become closer to an exact match with the unreconstructed string for the vocabulary strings to pass the admission function. Similarly, as the fuzziness factor increases, vocabulary strings may be less like the unreconstructed string and still pass the admission function; consequently, more reconstruction indexes will be computed. Raising the degree of fuzziness by making the fuzziness factor greater increases the number of candidate reconstructions.

Other virtues of the current method stem from the use of this admission function. The present invention has excellent rejection characteristics; this means that a wildly improbable reconstruction will be efficiently rejected without requiring the computation of a reconstruction index. Known symmetric similarity methods must compute their similarity measures before two strings can be judged as similar or dissimilar. These methods must compare an already computed similarity value with some predetermined threshold value before they can determine if two strings are similar "enough" for use in their application; this may lead an application of symmetric similarity algorithms to force matching of at least one vocabulary word with the input word by automatically using the highest computed similarity value, no matter how low this value might be.

This efficient use of the same pointers to search, to measure distance, to admit to candidacy, and to calculate the reconstruction index contributes to the speed of the present algorithm and apparatus. Consequently, execution speed is necessarily improved over prior art techniques; the length of processing time required by the present method is linearly proportional to the average length of the strings in the candidate vocabulary. Furthermore, it has been found that this asymmetric token reconstruction technique provides not only an acceptable but practically comparable simplification of far more complex symmetric similarity techniques, such that the execution time of the analysis increases only linearly with respect to the length of the vocabulary strings, making this method much faster than prior art techniques. Furthermore, the asymmetry of this method requires fewer character comparisons than symmetric similarity techniques, which need to examine every character in both strings being compared; this also contributes to the speed and simplicity of the present algorithm and apparatus. Also, computing a reconstruction index involves the pointers used to analyze the strings and comprise a function that is a simple mathematical ratio.

Token Reconstruction Apparatus

Furthermore, the present invention relates to any token reconstruction apparatus which may comprise comparators, incrementers, and logic arrays, a special application microprocessor, or alternatively may comprise a source code controlled microprocessor. Associated input means permits establishment of predetermined criteria while the output token may be displayed, processed further by a syntactic analyzer, or automatically substituted into a message. The source code is so simple that it may be easily run via floppy disk input or stored on hard disk leaving considerable storage in machine memory for comparison string vocabularies or data bases (shown in FIG. 1 as a vocabulary string).

Presented with a fragment of a token, i.e., an unreconstructed string, a vocabulary of complete tokens or strings, and several control parameters, the present token reconstruction apparatus will return a list of zero or more complete vocabulary strings that are candidate reconstructions of the unreconstructed string.

The unreconstructed token may be derived from a complete vocabulary token by character deletion, truncation, abbreviation, character transposition, character addition, and/or character substitution. The present invention will reconstruct a token from token fragments corrupted or derived from the original complete token by an arbitrary number of arbitrary character deletions. In this sense, the present invention is more generally applicable than spelling checkers or spelling correction mechanisms for it will provide spell checking and correction (under appropriate constraints) as one output of token reconstruction.

The preferred embodiment of the present invention is flexible and permits entry of predetermined parameters or criteria allowing operation of the algorithm to be tailored to an intended use and to characteristics of the vocabulary. These parameters comprise: degree of fuzziness (the fuzziness factor), analysis mode, and speed as well as acceptance threshold, match constraint, case sensitivity, and unit of analysis. The fuzziness factor, the analysis mode, and the speed parameters involve characteristics of the token reconstruction algorithm itself as executed by the apparatus; the acceptance threshold, match constraint, case sensitivity, and unit of analysis involve characteristics of the token reconstruction apparatus itself, i.e., how input and output from the token reconstruction algorithm may be controlled to provide further adaptability and flexibility for the user and/or system designer.

Fuzziness Factor

The fuzziness factor is an inverse indication of how many characters of the unreconstructed token must be found in a vocabulary token for admission as a candidate reconstruction. It is a positive integer value, ranging upwards from 0. Fuzziness governs the identification of vocabulary strings that may be candidate reconstructions of the input unreconstructed token; the admission function uses the fuzziness factor to determine whether to admit a vocabulary token to the computation of its reconstruction index. When the fuzziness factor is 0, all the characters in the unreconstructed token must be found in a vocabulary token for the vocabulary token to be admitted for computation of its reconstruction index, making the vocabulary token a candidate reconstruction of the unreconstructed token. With a fuzziness factor of 0, a successful reconstruction can be reliably made when an unreconstructed token has been derived from a vocabulary token by arbitrary character deletions.

When the fuzziness factor is 1, all but one character in the unreconstructed token must be found in a vocabulary token to the vocabulary token to be admitted as a candidate reconstruction and its reconstruction index computed. With this degree of fuzziness, successful reconstruction can be made when an unreconstructed token has not only been derived from a vocabulary token by arbitrary character deletions but also by a transposition of characters, an incorrect character, or an additional character.

As the fuzziness factor increases, the set of candidate reconstructions increases using the present algorithm. In an auto-fuzziness mode of operation, the fuzziness factor may be automatically incremented from zero until some vocabulary string offered for evaluation is admitted for computation of its reconstruction index and becomes a candidate reconstruction.

Analysis Mode

Analysis mode relates to the selection of the first reference end of the strings under analysis. The disclosed invention provides for three modes of analysis. In a "front-emphasis" mode, more weight is given for characters from the vocabulary token matching characters at the beginning of the unreconstructed token. In a "rear-emphasis" mode, more weight is given for characters from the vocabulary token matching characters at the end of the unreconstructed token. In a "balanced-emphasis" mode, proportional weight is given to characters matching toward the beginning and toward the end of an unreconstructed string. Accuracy may be increased by combining front-emphasis and rear-emphasis analyses into a balanced-emphasis; the reconstruction index values achieved by a vocabulary token in both front-emphasis and read-emphasis analyses are proportionally combined to determine whether the vocabulary token is a reasonable candidate for reconstructing the unreconstructed string.

Speed

Speed relates to the speed at which the Token Reconstruction algorithm executes. The algorithm of this invention is presented in two forms: normal and fast. The "normal" form speed is described by the description of the Token Reconstruction algorithm given above. The "fast" form of the algorithm is a degenerate form of the normal speed form in which steps 1 and 2 are combined; all pointers, with reference to both ends of the strings, are computed simultaneously. In this form, the algorithm terminates when the pointer j collides with jlim and/or the pointer k collides with klim. Thus, the maximum number of character comparisons in the fast form is the number of characters in the vocabulary string. While the fast form is extremely fast, the reconstruction indexes computed from the values of the pointers produced by fast form analysis of the input strings are less intuitively satisfactory than those produced by normal form analysis. The availability of the two speed forms allows the user and/or system designer to perform performance tradeoffs between accuracy and execution speed.

Acceptance Threshold

Acceptance threshold relates to preselection of a minimum reconstruction index value that a vocabulary token must have before it may be offered as a candidate reconstruction. The disclosed invention is characterized by an asymmetric evaluation function that provides a reconstruction index that ranges from 0.0 (completely unlikely that the unreconstructed string would be reconstructed as this vocabulary string) to 1.0 (the unreconstructed token is identical to this vocabulary token). For example, if the unreconstructed token is 'melt' and the vocabulary token is 'weld', the returned reconstruction index will be zero. The algorithm will give this reconstruction index value because none of the letters in 'melt' match either the first or the last letter of 'weld', even though they share the same central characters 'el'. While these two words might be evaluated as quite similar by an algorithm that measures symmetric similarity between strings, it is extremely unlikely that 'melt' would be an unreconstructed token fragment derived from the vocabulary token 'weld'.

In the preferred embodiment, the Token Reconstruction Apparatus according to the invention returns an ordered list of the most likely reconstructions, along with their respective reconstruction indexes. The method allows an acceptance threshold to be predetermined. All vocabulary tokens with a reconstruction index less than this acceptance threshold will not be included in an output ordered list or ranking of likely reconstructions.

Match Constraint

Match constraint relates to predetermining a character match constraint if desired. Normally, there is no constraint on the admission of vocabulary strings into the set of vocabulary tokens to be analyzed. However, in certain applications, such as command language processing, it has been observed that keyboard users seldom make an error typing the first character of an input string. This invention provides for entry of a constraint that the first character of the unreconstructed token must match the first character of the vocabulary token before the vocabulary token will be admitted for further analysis; this more accurately reflects that problem characteristic and greatly decreases processing time.

Case Sensitivity

Case sensitivity relates to the user selectability of sensitivity of analysis to upper and/or lower case characters, that is, for example, whether the case of the letters in the strings, such as an initial capital, is important to the analysis. Sensitivity to case may be selected from one of three possible choices: none (no sensitivity), seven-bit, or alphabetic, as will be herein explained.

Unit of Analysis

Unit of analysis (chunking) relates to defining the set of vocabulary tokens that will be analyzed. While the token reconstruction algorithm was originally devised to work on individual unreconstructed token fragments and to analyze strings that contain only a single word, it has been discovered that the method also applies to a sequence of unreconstructed tokens contained within an input string and to vocabulary strings containing a sequence of words (individual tokens), such as a phrase or an entire data record. This invention provides a means of selecting the unit of analysis that matches the problem most closely:

- by word—the input is treated as a single unreconstructed token fragment and the vocabulary is examined on a word-by-word basis,
- by phrase—the input is treated as one or more unreconstructed token fragments and the vocabulary is examined by looking at phrases marked by user-definable delimiters such as parentheses, or
- by record—the input is treated as one or more unreconstructed token fragments and the vocabulary is examined as strings containing multiple words (tokens).

Consequently, the present invention also meets the requirement of providing flexible control over the analysis performed as well as over the output of the analysis such that the analysis may be tailored if desired to the application or to accomplish even faster results.

BRIEF DESCRIPTION OF THE DRAWINGS

FIG. 1e shows the functional units of FIG. 1c invoked to perform balanced-emphasis analysis using the fast speed form of token reconstruction.

FIG. 2 is a block schematic diagram of one embodiment of the token reconstruction apparatus of FIG. 1 in the form of a source code controlled microcomputer.

FIG. 3 provides an overview or key for combining flowcharts of FIGS. 4 through 12 into a particular algorithm determined by speed form and/or analysis mode of operation, the flowcharts for determining the operation of source code controlled microcomputer 100 of FIG. 2. FIG. 3a shows front-emphasis analysis mode and the speed forms. FIG. 3b shows rear-emphasis analysis mode and the speed forms. FIG. 3c shows balanced-emphasis analysis mode, referencing FIGS. 3a and 3b.

FIG. 4 is a flowchart of an initialization routine for establishing initial values for pointers to the unreconstructed string, a vocabulary string, and a reconstruction index as shown in FIG. 1.

FIG. 5 is a flowchart of the fast form algorithm which provides high speed and reasonably reliable token reconstruction index measures.

DETAILED DESCRIPTION

FIGS. 1 through 12, for which copyright protection under all applicable laws is asserted, describe a Token Reconstruction Unit and a Token Reconstruction Apparatus.

Figure 1A:
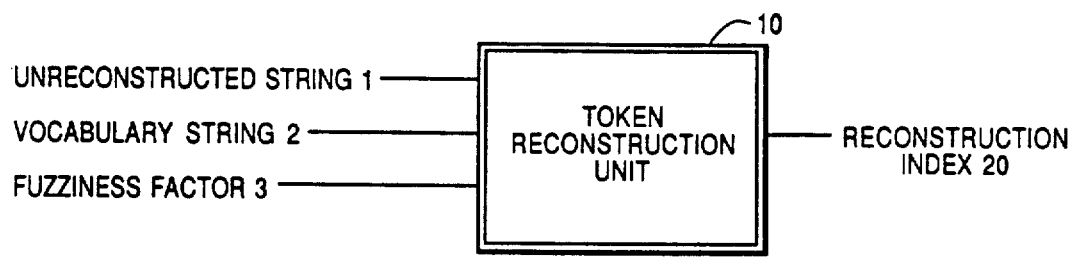
FIG. 1a is a simplified block schematic diagram of the token reconstruction algorithm or method in accordance with the present invention.

According to FIG. 1a, there is shown a Token Reconstruction Unit (TRU) 10 in accordance with the present invention which requires the following inputs: an unreconstructed string 2 and at least one vocabulary string 2. A fuzziness factor 3 is an input which allows a user of the token reconstruction unit 10 to regulate the degree to which the unit may provide an output reconstruction index 20 for the at least one vocabulary string 2. According to the algorithm as will be described herein, vocabulary string 2 may or may not be become a candidate reconstruction of the input unreconstructed token fragment 1 as it meets (or does not meet) certain criteria for reconstruction index computation as will also be further described herein. Other controls over the operation of token reconstruction unit 10 will be described herein in further detail, such as speed and analysis mode.

Figure 1B:
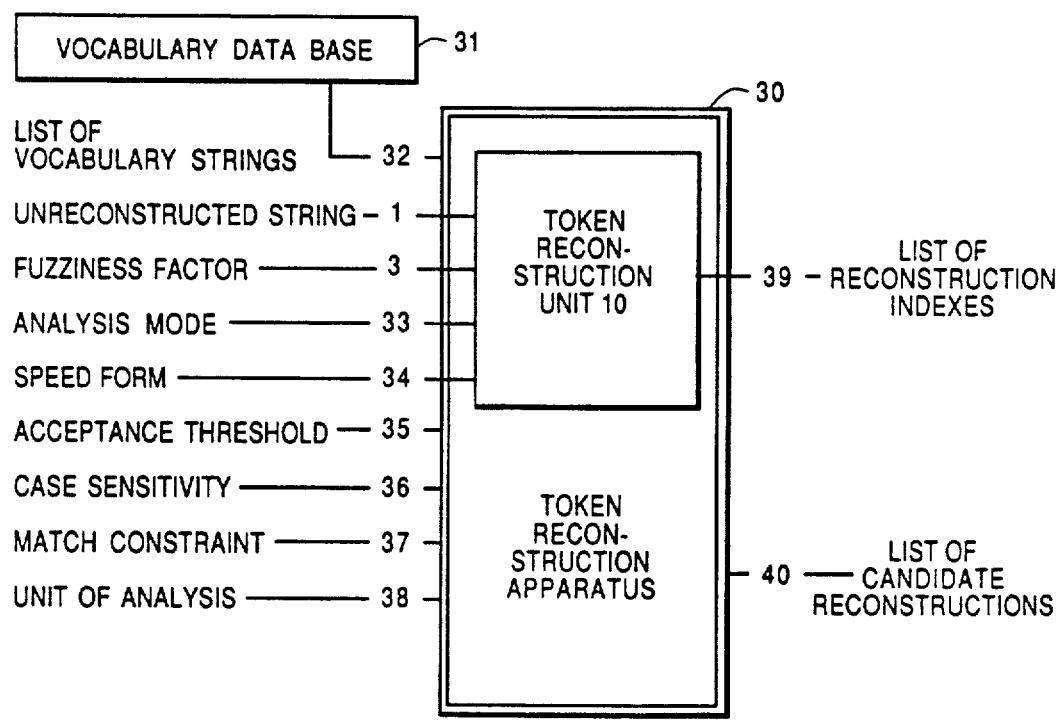
FIG. 1b is a simplified block schematic diagram of the present token reconstruction apparatus in accordance with the present invention.

According to FIG. 1b, there is shown a Token Reconstruction Apparatus (TRA) 30 in accordance with the present invention which incorporates the TRU lo. It requires as input a source list of vocabulary strings 32, originating from some source here shown as the vocabulary data base 31. Other inputs include an unreconstructed string 1 and fuzziness factor 3 as shown in FIG. 1a. Inputs also include control parameters for analysis mode 33, speed form 34, acceptance threshold 35, case sensitivity 36, match constraint 37, and unit of analysis 38. These controls over the operation of token reconstruction apparatus 30 will be described herein in further detail. Output from TRA 30 is a list of reconstruction indexes 39, containing all reconstruction indexes 20 as computed by the TRU 10, and a list of zero or more candidate reconstructions 40.

Figure 1C:
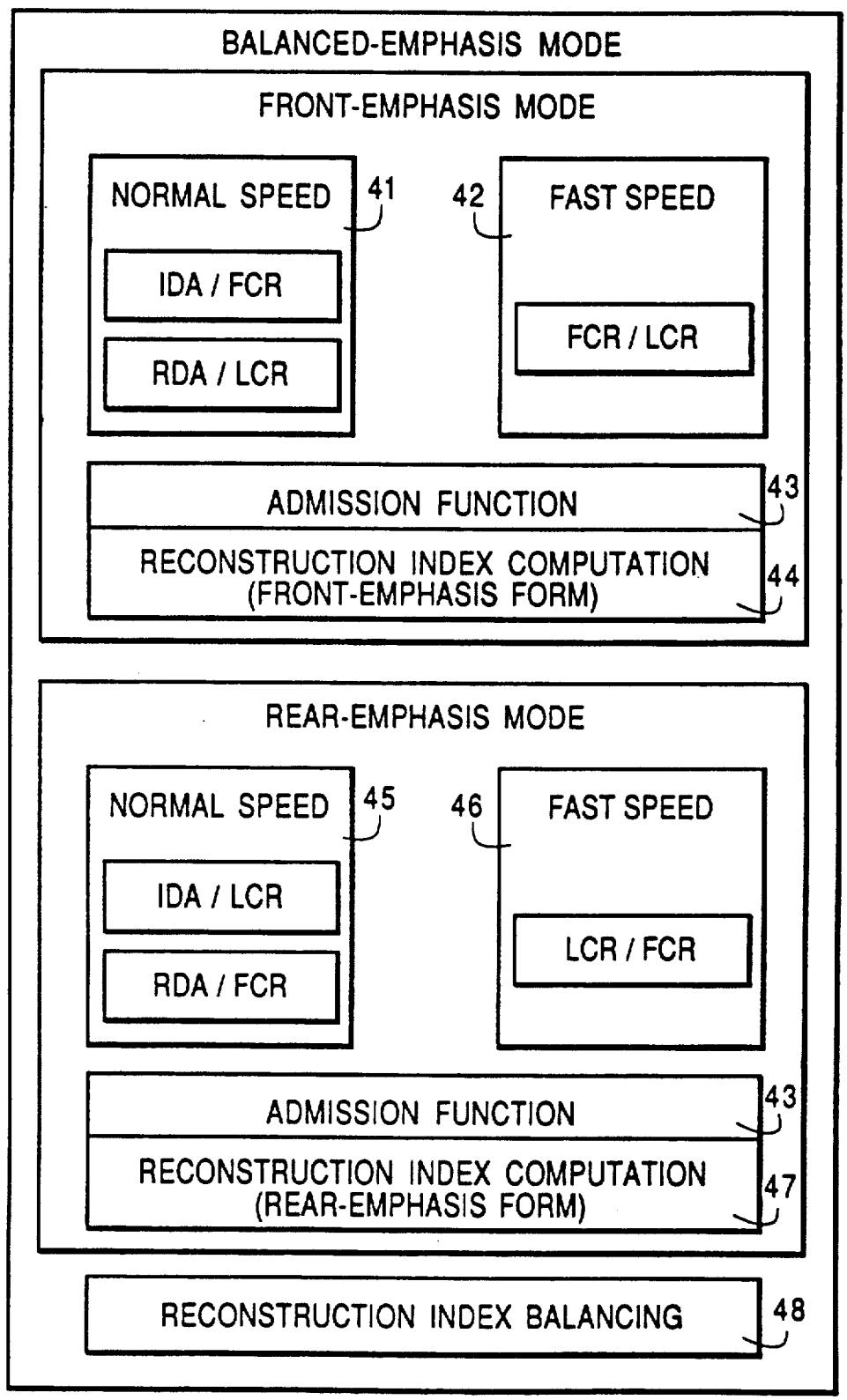
FIG. 1c is details the Token Reconstruction Unit of FIG. 1a using a functional block diagram.

FIG. 1c show the functional components of token reconstruction unit 10 that may be combined and selected using token reconstruction apparatus 30 to configure TRU 10 for the desired analysis mode and speed form. The normal speed form for front-emphasis analysis 41 and the fast speed form for front-emphasis analysis 42 are mutually exclusive. The results of the distance analysis performed by either 41 or 42 are passed to the admission function 43. For front-emphasis analysis, the front-emphasis form of reconstruction index computation 44 is used. The normal speed form for rear-emphasis analysis 45 and the fast speed form for rear-emphasis analysis 46 are also mutually exclusive. The results of the distance analysis performed by either 45 or 46 are passed to the same admission function 43. For rear-emphasis analysis, the rear-emphasis form of reconstruction index computation 47 is used. With balanced-emphasis analysis, the outputs from 44 and 47 are combined in reconstruction index balancing 48.

These components may be combined to provide six analysis mode/speed form configurations, as follows:

| Analysis/Mode | TRU 10 components |
| --- | --- |
| front-emphasis, normal speed | 41,43,44 |
| front-emphasis, fast speed | 42,43,44 |
| rear-emphasis, normal speed | 45,43,47 |
| rear-emphasis, fast speed | 46,43,47 |
| balanced-emphasis, normal speed | 41,43,44,45,43,47,48 |
| balanced-emphasis, fast speed | 42,43,44,46,43,47,48 |

Figure 1D:
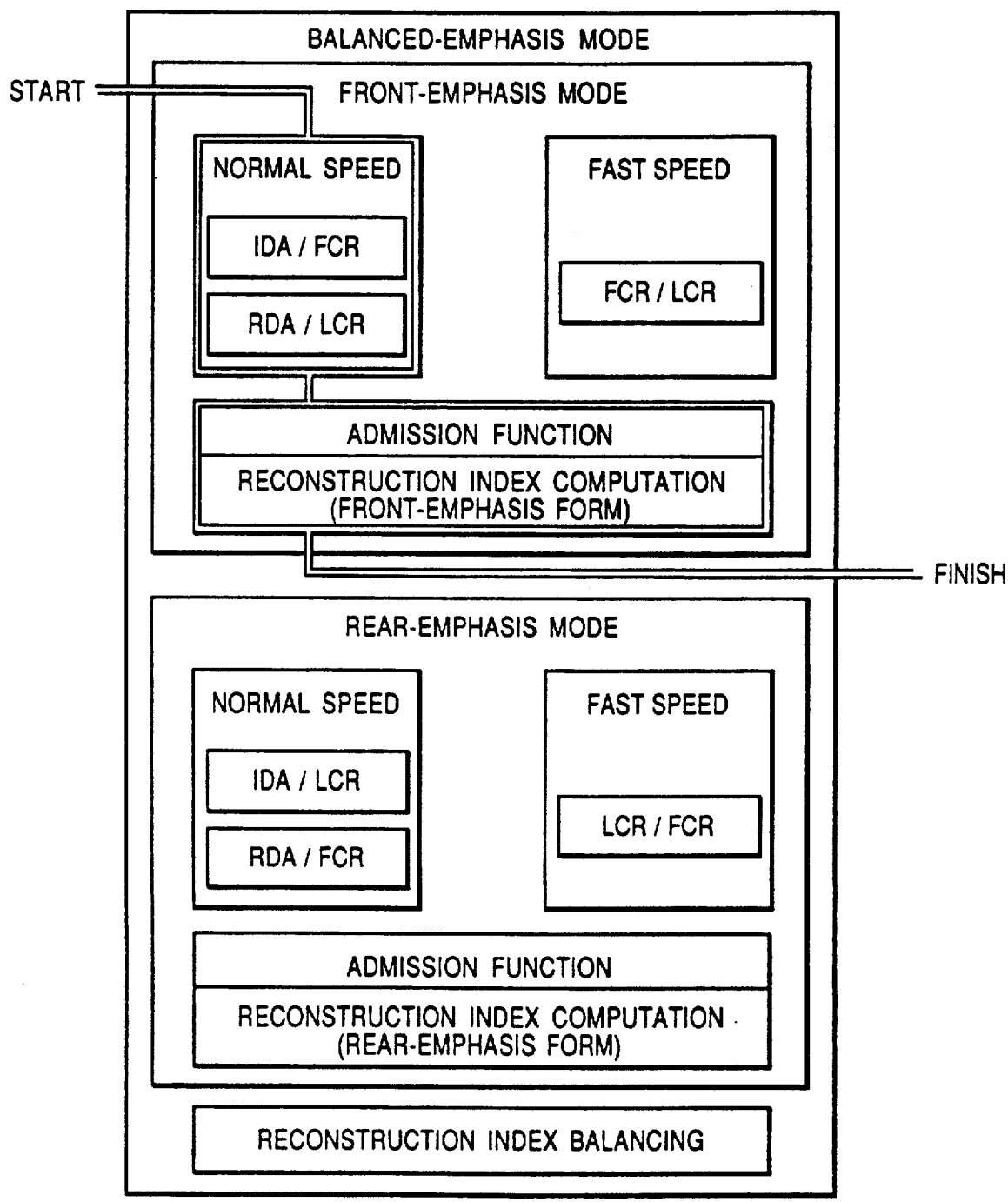
FIG. 1d shows the functional units of FIG. 1c invoked to perform front-emphasis analysis using the normal speed form of token reconstruction.

FIG. 1d shows the configuration of TRU 10 components as listed in the above table for front-emphasis analysis mode using the normal speed form.

FIG. 1e shows the configuration of TRU 10 components as listed in the above table for balanced-emphasis analysis mode using the fast speed form.

Figure 1F:
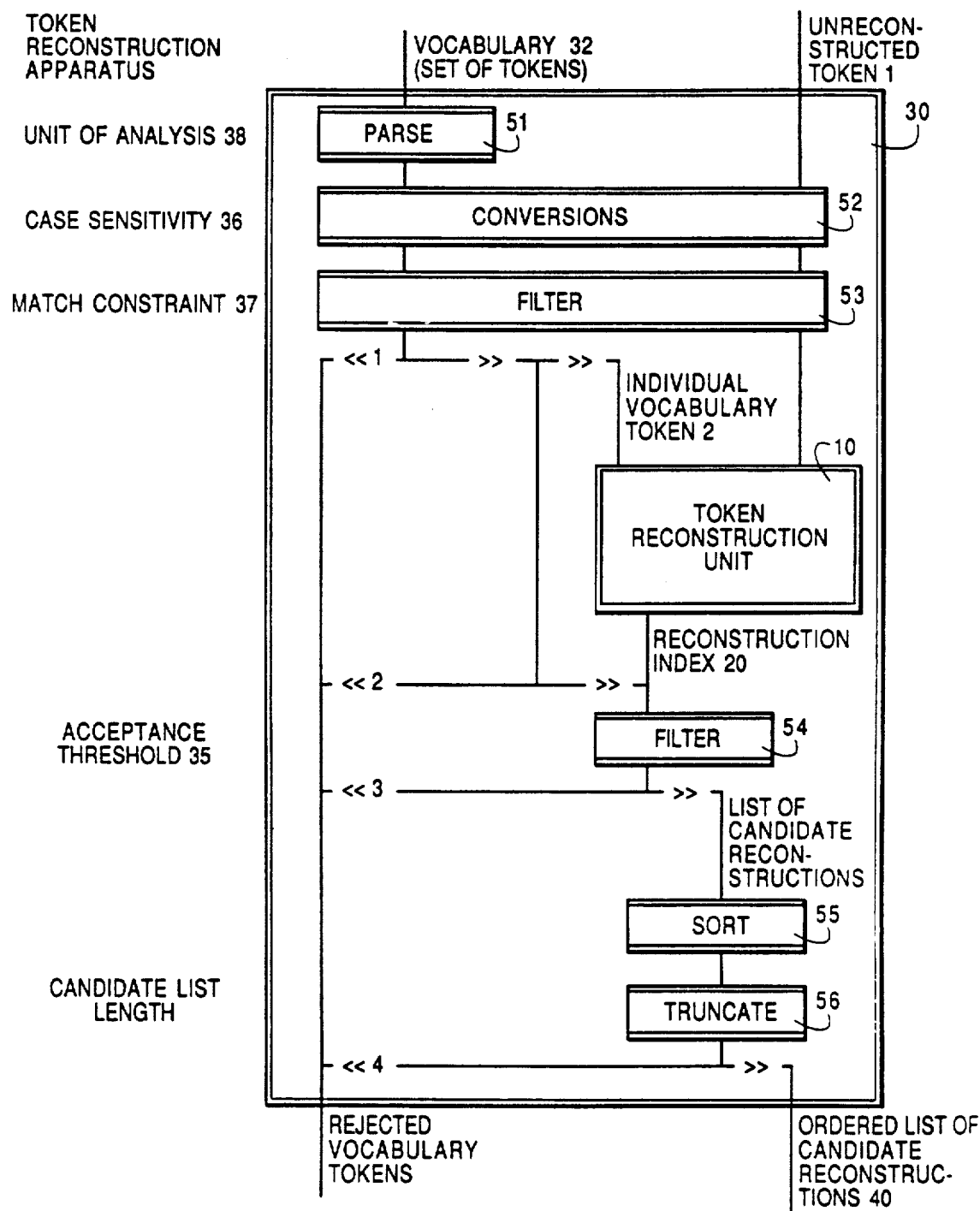
FIG. 1f provides detail of FIG. 1b as a functional block diagram and also shows the flow of tokens through the apparatus.

In FIG. 1f detail of the Token Reconstruction Apparatus 30 of FIG. 1b is shown using a functional block diagram. FIG. 1f also shows the paths a vocabulary token 2 might take through TRA 30 and TRU 10. (For clarity, not shown in FIG. 1f are the TRU 10 controls fuzziness factor, analysis mode, and speed form.)

According to FIG. 1f, different paths are shown that a vocabulary token may take through the Token Reconstruction Apparatus. Several are marked by the symbol <<n. The meaning of these paths is as follows:

<<1 If the match constraint is in effect, a vocabulary token whose first character does not match the first character of the unreconstructed token is rejected as this point; a vocabulary token that fails a match constraint is never presented to the Token Reconstruction Unit.

<<2 A vocabulary token that fails the admission function is rejected. The vocabulary token's effective reconstruction index is 0.00.

<<3 A vocabulary token whose reconstruction index is less than the value of the acceptance threshold is rejected.

<<4 A vocabulary token whose reconstruction index is the lowest in an ordered list of a defined number of candidate reconstructions will be rejected if a vocabulary token with a high reconstruction index is inserted into the list; it "falls off" the bottom of the ordered list.

The vocabulary strings 32 are parsed 51 according to the unit of analysis control 38 into complete strings or records, phrases, or individual words or tokens. Depending upon the case sensitivity control 36, any appropriate conversions 52 are made to the vocabulary token 2 and/or the unreconstructed token 1. Depending upon the match constraint control 37, the first characters of the vocabulary token 2 and the unreconstructed token 1 are compared 53. Should a vocabulary token fail this comparison 53, it becomes a rejected vocabulary token, according to exit <<1.

The parsed, converted, and filtered vocabulary string 2 is passed to Token Reconstruction Unit 10 along with the unreconstructed token 1 (fuzziness factor, speed form, and analysis mode controls not shown). Output from TRU 10, as in FIG. 1a, is a reconstruction index 20 for the vocabulary string 2 with respect to the unreconstructed string 1. Exit <<2 shows that TRU 10 may reject a vocabulary string 2 without calculating a reconstruction index 20, for a reconstruction index of 0.00 indicates a vocabulary string that failed the admission function 43, as shown in FIG. 1c.

An acceptance threshold 35 is applied to the reconstruction index 20 output from TRU 10 as an additional filter 54. Exit <<3 shows that a vocabulary string 2 may be rejected at this point because its reconstruction index 20 value is lower than the value of the acceptance threshold 35. Any and all candidate reconstructions that remain, as indicated by a list of reconstruction indexes 39, are attached to their respective vocabulary string; this list is sorted 55 and possibly truncated to a maximum length 56 so that the most likely reconstruction becomes the first in the list of candidate reconstructions 40 and the list contains only the most likely of candidate reconstructions. Exit <4 shows that candidate reconstructions may be rejected at this point because their reconstruction indexes are less than the reconstruction index of the candidate reconstruction that becomes the last element of a limited list of candidate reconstructions.

Thus, FIG. 1f shows the output of TRA 30 as an ordered list of candidate reconstructions 40, each entry in this list being determined by comparing individual vocabulary strings 2 from a vocabulary data base 31 with the unreconstructed token 1, a reconstruction index 20 being computed for all vocabulary strings 2 that pass the admission function 43 within TRU 10.

Token Reconstruction Unit 10 and Token Reconstruction Apparatus 30 may comprise a source code controlled microcomputer 100 as shown in FIG. 2. Source code may be compiled and stored in read-only memory (ROM) 130, maintained on floppy disk for execution by microprocessor 110 as required, stored on hard disk or in random access memory 140, or otherwise input or stored by microprocessor 110. Via keyboard 150 or under program control, a user enters control data such as fuzziness factor 3 and an input unreconstructed token fragment 1 which may be displayed as feedback to the user on display or other output device 120. A vocabulary string 2 may be an element of a command language vocabulary database, a natural language database, a decryption translation database, or simply a list of character strings or words. It is most likely that any of these exemplary databases may be preloaded into random access memory 140 from where they have previously been stored, for example, on hard disk or, if a short list of character strings or words, may be entered directly via keyboard 150.

Token Reconstruction Unit software is described by the flowcharts of FIGS. 3 through 12, and describes processes for initialization of data for indices and pointers (j, jlim, k, and klim) into the unreconstructed string 1 and the vocabulary string 2. Using the normal speed form, depending on certain control data input by the user, the Token Reconstruction Unit 10 proceeds with an Initial Distance Analysis of the input token fragment 1 with respect to one end or the other of the string. If all characters or symbols of the unreconstructed token fragment are accounted for by the conclusion of the IDA, Reverse Distance Analysis is deemed unnecessary in accordance with the present invention, saving processing time and promoting efficiency. Otherwise, RDA continues the analysis. Using the fast speed form, the IDA and RDA are combined and take place concurrently rather than sequentially.

After producing values for the pointers j, jlim, k, and klim, the Token Reconstruction Unit 10 computes the reconstruction index for the vocabulary string 2, provided that the pointers j and jlim meet certain criteria expressed by the admission function. For example, no reconstruction index will be calculated for a vocabulary string z that has no characters in common with an unreconstructed string, i.e., the vocabulary token's effective reconstruction index is 0.0. If more than one candidate reconstruction is found in the vocabulary, these candidates may be sorted according to reconstruction index value and displayed on display 120 Or other output device of microcomputer 100. Alternatively, the candidate reconstruction having the highest index value may be automatically substituted into a message or passed sequentially to a syntactic analyzer (not shown) for further analysis.

Referring briefly to FIGS. 4 through 12, it may be seen that token reconstruction unit 10 may alternatively comprise comparators, incrementers, delay circuits, and simple logic circuits known in the art. In other words, logical steps shown in flowcharts for software may be just as easily constructed in so-called hardware. Token reconstruction unit 10 also need not comprise a microcomputer 100 but may be practically any size controller of any size or capacity. Depending on the speed of message transmission, the present token reconstruction unit 10 may be appropriately arranged to provide real-time data processing of incoming messages.

One must note that the herein described algorithm does not arrange or select the set of vocabulary tokens that make up the vocabulary data base. The present algorithm is dependent upon the vocabulary string 2 being formatted and selectively supplied from an external data base. For example, a command language vocabulary set would not be appropriate for decryption of an encrypted message. Furthermore, while chunking (selecting a unit of analysis) by word, phrase, or record is permitted, a given unreconstructed string 1 and vocabulary string 2 must be appropriately formatted for analysis by the token reconstruction unit 10. For example, a database must be divided into words, phrases, and/or records by appropriate indicators such as end-of-line characters to separate records, the use of parentheses to separate phrases from words, and spaces to separate individual words.

The algorithm deals solely with the question of whether an input unreconstructed token fragment(s) can be expanded into a prestored vocabulary token or complete message. The present invention does not relate to techniques for database preparation or for reducing the search space, that is, for selecting vocabulary strings for analysis and for efficient entry into and retrieval from this search space. These techniques are fundamental to the proper preparation of input but do not relate to the fundamental incompleteness assumption of the problem that this invention addresses, the reconstruction of a complete token from a token fragment, generally of equal or shorter length.

The characteristics of the problem addressed include a limited and highly structured vocabulary, that is, that the search space is inherently limited in its totality and that syntactic analysis provides a local context that may limit the search space to syntactically valid categories at any point in the analysis of the input stream of token fragments (unreconstructed strings). Because analytic techniques can not be shown to converge upon a single reconstruction when completeness and correctness constraints are relaxed, it has been found that the most feasible approach is based upon lexical analysis, that is, character or symbol-based comparisons between the vocabulary strings and the input unreconstructed strings. As a result, it is important that any algorithm for token reconstruction essentially reduce to a basic character-by-character comparison in the best case when the unreconstructed token fragment exactly equals the vocabulary token.

In the worst case, when no characters are shared between the unreconstructed token and the vocabulary token, the algorithm of this invention requires twice as many character comparisons as there are characters in the vocabulary token. Thus, the worst case execution time is strictly linear with respect to the average length of strings in the set of vocabulary strings.

Detailed Description of the Token Reconstruction Unit Algorithm in Normal Speed Form The token reconstruction unit 10 according to the present invention operates as follows, using the normal speed form:

1. A token fragment (unreconstructed token 1) and a fuzziness factor 3 are presented to the token reconstruction unit (TRU) 10.

2. Each vocabulary token 2 is sequentially presented to the TRU 10 until all vocabulary strings have been considered.

For each vocabulary token:

2a. Initial Distance Analysis (IDA). For each string, at least one pointer is maintained in memory: j and jlim for the unreconstructed string and k and klim for the vocabulary string. Additionally, in the normal speed form, the pointer lastk is also maintained for the vocabulary string.

The characters in the vocabulary token are compared with the characters in the unreconstructed token, starting from the beginning (or from the end) of the strings, in order to find the position of the first character in the unreconstructed string that does not match, in order, a character in the vocabulary string, with respect to one end of these strings; call the pointer to this position j. Remember the position of the last character examined in the vocabulary string; call the pointer to this position k. After each character comparison, this pointer into the vocabulary string k is incremented (decremented). The pointer into the unreconstructed string j is incremented (decremented) only when a character comparison shows matching characters.

The position of the last character in the vocabulary string that did match a character in the unreconstructed string is saved; each time such a match is found, the current value of the pointer k into the vocabulary string is saved in the pointer lastk. Consequently, at least one pointer serves dual functions: pointing into a string which in effect records the distance from the given starting end of the string. This step is termed Initial Distance Analysis (IDA).

Note that if the last character in a string is found to match a character in the other string, the j and/or k position may be the position of an imaginary character just past the other end of that string.

If the initial analysis is made with respect to the beginning of the string, this step may be termed Initial Distance Analysis/First Character Reference (IDA/FCR). If the initial analysis is made with respect to the end of the string, the step may be termed Initial Distance Analysis/Last Character Reference (IDA/LCR).

2b. If all of the characters or symbols of the unreconstructed string are accounted for during the Initial Distance Analysis, further analysis is terminated. Such action promotes the efficiency and rapid execution of the present invention.

2c. Reverse Distance Analysis (RDA). Otherwise, the Reverse Distance Analysis (RDA) is executed. For each string, pointers are kept in memory: jlim for the unreconstructed string and klim for the vocabulary string.

The characters in the vocabulary string are compared with the characters in the unreconstructed string, this time with respect to the opposite end of the strings from the end used in the IDA. This is done to find the first character in the unreconstructed string that does not match, in order, a character in the vocabulary string, with respect to the other end of the vocabulary string; call the pointer to this position jlim. Remember the position of the last character to be examined in the vocabulary string; call the pointer to this position klim. After each character comparison, the pointer into the vocabulary string klim is decremented (incremented). The index into the unreconstructed string jlim is decremented (incremented) only when a character comparison shows a match.

This search with respect to the other end of the vocabulary string is undertaken with two constraints. The search shall consider only (a) those characters in the vocabulary string that precede the position lastk as found in IDA, and (b) those characters in the unreconstructed string that precede and include the position j.

In other words, any matched characters will be examined only once. Any character matched in IDA will not be examined again in RDA.

Note that if the last character in a string is found to match a character in the other string, the jlim and/or klim position may be the position of an imaginary character just past the other end of that string. On the other hand, because of the constraints a) and b) on the selection of characters to examine, the pointers jlim and klim will not point to the last character that has been examined but to the position of the last character that would have been examined if these constraints were not enforced.

This search for characters that do not match will generate the four pointers: j, jlim, k, and klim. Two pointers, j and jlim, will exist for the unreconstructed string; likewise two pointers, k and klim, will exist for the vocabulary string. These pointers will point to the last characters examined in both strings except that if either constraint (a) and/or (b) has been invoked, the jlim and/or klim pointers will point to the last characters that would have been examined during RDA. In particular, these pointers will never point to a character that has been matched in the step with which they are associated. This means that neither j nor k will point to a character that has been matched in IDA. Likewise, it means that neither jlim nor klim will point to a character that has been matched in RDA.

If the initial analysis has been made with respect to the beginning of the string, this step may be termed Reverse Distance Analysis/First Character Reference (RDA/FCR). If the initial analysis has been made with respect to the end of the string, the step may be termed Reverse Distance Analysis/Last Character Reference (RDA/LCR).

3. Reconstruction Index Computation. The third step accomplished by TRU 10 is the computation of the reconstruction index for the vocabulary string with respect to the unreconstructed string. At the conclusion of the comparison process, the TRU 10 computes a reconstruction index that can be used to order a list of vocabulary tokens into their decreasing/increasing likelihood of being reconstructions of the input unreconstructed token. If ordered by decreasing reconstruction indexes, the best reconstruction will be first in such a list.

The pointers, j, jlim, k, and klim, when compared to pointers to the origin of each string, give a measure of the distance of the unmatched character(s) from the origin established during IDA. The ratio of the sum of these distances, the sums being taken with respect to the pair of pointer distances for each string, is the relative likelihood that the vocabulary string is a correct reconstruction of the unreconstructed string. This is the reconstruction index and the vocabulary string for which a reconstruction index is computed is a candidate reconstruction.

The simple equation for computing the reconstruction index is normally $$x=(j+jlim)/(k+klim)$$

The resulting value is between 0.0 and 1.0, where 1.0 is related to a perfect match between the unreconstructed string and the vocabulary string while 0.0 is related to there being no likelihood at all that the vocabulary string can be a correct reconstruction of the unreconstructed string. The variables of this equation also, as indicated above, serve as pointers into the strings leading to the extreme simplicity of both the analysis and computational portions of the present method.

The reconstruction index equation provides an output without considering the contents of the compared strings because the pointers represent the shared information value of the matching characters in the two strings. The final pointer value of k indicates how far into the vocabulary string analysis traveled to find the character pointed to by j in the unreconstructed string. Similarly, klim describes the extent of analysis of the vocabulary string from the other direction to find the character pointed to by jlim in the unreconstructed string.

The reconstruction index is computed only when the pointers j and jlim associated with the unreconstructed string meet criteria established by the fuzziness factor. The fuzziness factor governs how close the values of the pointers j and jlim must be to one another before a vocabulary string will be admitted as a candidate reconstruction and have its reconstruction index computed. This relationship between the fuzziness factor and the pointers j and jlim is termed the admission function: ((jlim−j) fuzziness ). Within this admission function, the fuzziness factor limits the acceptable distance between the unreconstructed string pointers, with respect to the origin of the unreconstructed string.

The fuzziness factor is used in the admission function to limit the distance between the pointers j and jlim with respect to the origin of the unreconstructed string. A fuzziness factor of 0 in the admission function constrains the pointer jlim to be less than the pointer j with respect to the origin of the unreconstructed string before a reconstruction index will be computed; the jlim pointer must have "crossed over" the j pointer during the second step. Each increase in the fuzziness factor allows the pointer jlim to be further from the origin with respect to the pointer j; in other words, as the fuzziness factor is increased, a reconstruction index will be computed for vocabulary strings that generate j and jlim pointers for the unreconstructed string that are farther and farther apart.

The evaluation of the reconstruction index is not symmetric with respect to the unreconstructed string and the vocabulary string. Technically, the function does not ask how similar are two words but rather how likely it is that one string is a reconstruction of another. Characters in the vocabulary string are compared with characters in the unreconstructed string. All other token, word, or string comparison methods are either symmetric or compare the characters from the input string to the comparand string. This lack of symmetry is reflected by the engineering tradeoff decision seen in the accompanying source code to present the unreconstructed string to the TRU 10 before any vocabulary strings are presented to the TRU 10. In another engineering tradeoff, the unreconstructed string and the vocabulary string could easily be presented as a pair for each individual use of the present method.

It may be seen from the description of the algorithm according to the present invention that the Token Reconstruction Unit 10 may be also embodied in hardware, for example, as a string co-processor chip, as well as in software. This disclosure is intended to cover the algorithm of the invention in all implementations.

The accompanying source code listing of the microfiche appendix contains two complete and well commented embodiments of the invention. One listing presents a complete demonstration program. Another listing presents a complete implementation for use in a command language application. These listings demonstrate the parameters established for the method.

The simplicity of the algorithm lends itself to adoption for flexible operation as will be described in connection with FIGS. 3 through 12. Referring more particularly to FIGS. 3a and 3b, the fast speed forms of the algorithm are denoted A and D and the two normal speed forms of the algorithm are denoted B and C respectively referring to front-emphasis and rear-emphasis modes of analysis. In normal form and front-emphasis mode of operation, analysis is performed by an IDA/FCR and RDA/LCR pair. In normal form and rear-emphasis mode of operation, analysis is performed by an IDA/LCR and RDA/FCR pair. In fast form and front-emphasis mode of operation, analysis is combined into a single FCR/LCR while with rear-emphasis mode of operation, analysis uses a single LCR/FCR form. The front-emphasis mode of operation if chosen by the user/designer assures that more weight is given to character matches found at the beginning of a vocabulary string. This is normal usage because typically in situations such truncation and abbreviation, the beginning of a vocabulary string should have greater importance in analysis.

A rear-emphasis mode of operation assures that more weight is given to character matches at the end of a vocabulary string. Depending upon the application, such as static analysis of compound phrases, this may be an appropriate assumption.

A balanced-emphasis mode of operation combines the results of algorithm portions B and C in normal form or portions A and D in fast form, so that emphasis on both the front and rear of a vocabulary string may be used to perhaps provide additional candidate reconstructions. Balanced emphasis thus may be useful in the event of a mistyping at the beginning of an unreconstructed string which may be discounted by a rear-emphasis analysis via algorithm C.

Figure 8:
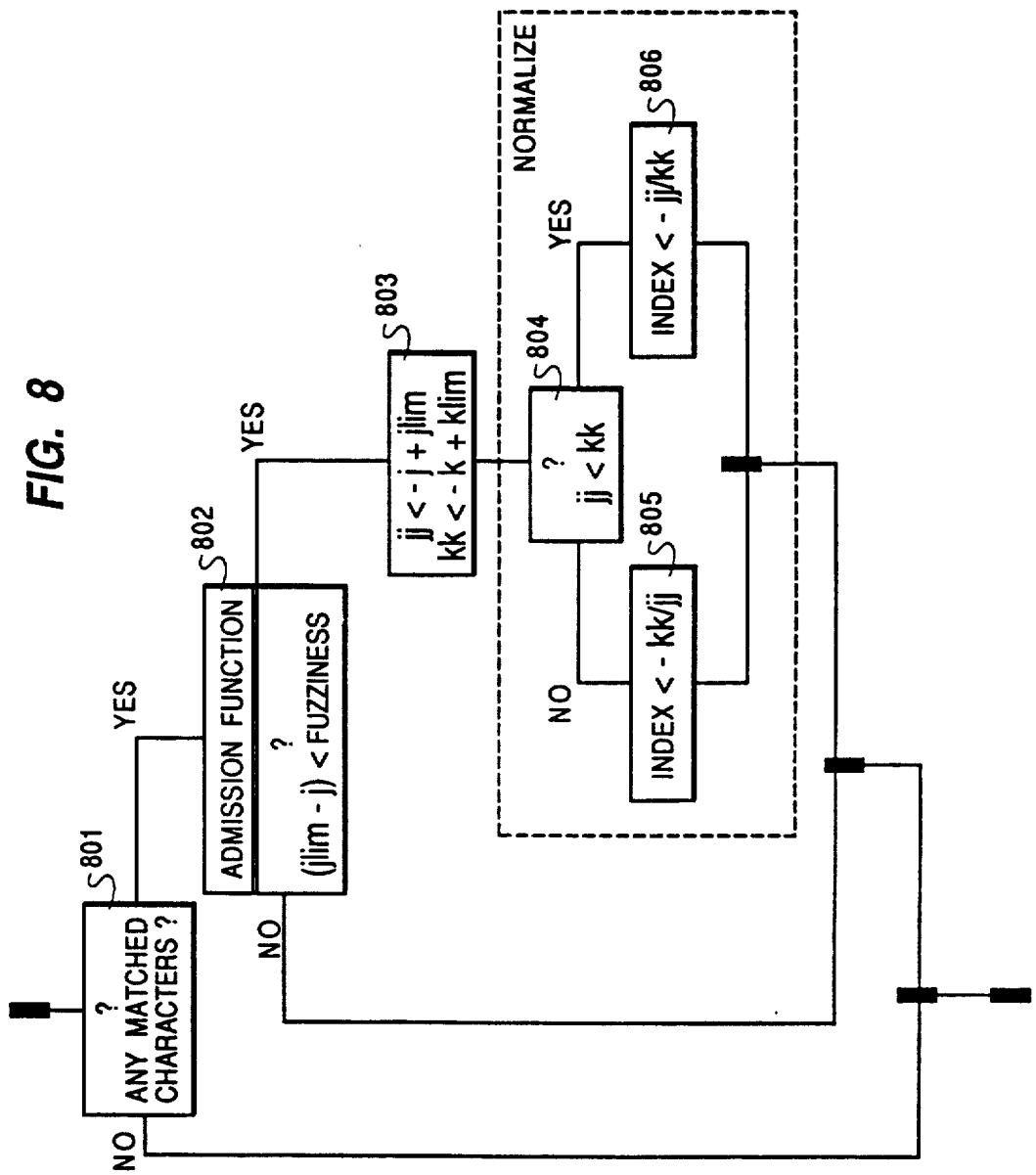
FIG. 8 is a flowchart of a reconstruction index computation applicable both for the fast and the normal speed forms in the front-emphasis analysis mode.

FIGS. 4, 5, and 8 together comprise a fast form of the operating algorithm in accordance with the present invention. Referring first to FIG. 4, an initialization algorithm is shown applicable to all modes of operation including a high speed operation. At step 401, the reconstruction index is initialized to zero. At step 402, the input unreconstructed string S is stored in temporary operating memory and pointers j and jlim established. At step 403, the vocabulary string v is stored in temporary operating memory and initial values for k, klim, and lastk assigned. In an RDA, lastk is set to klim+1 instead of to zero so that the pointer points just past the end of the vocabulary string.

Figure 5A:
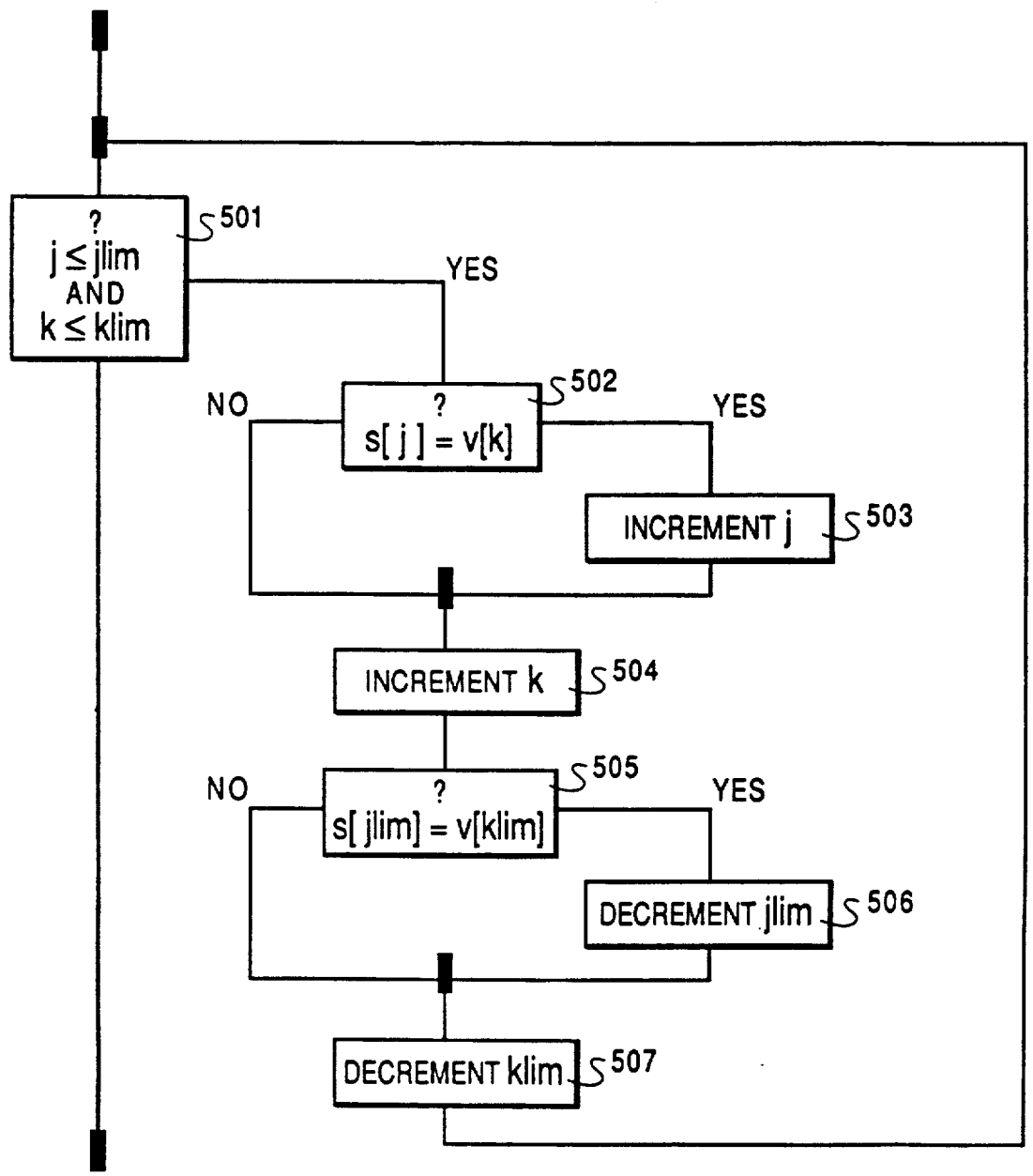
FIG. 5a shows the fast form for front-emphasis analysis.
Figure 5B:
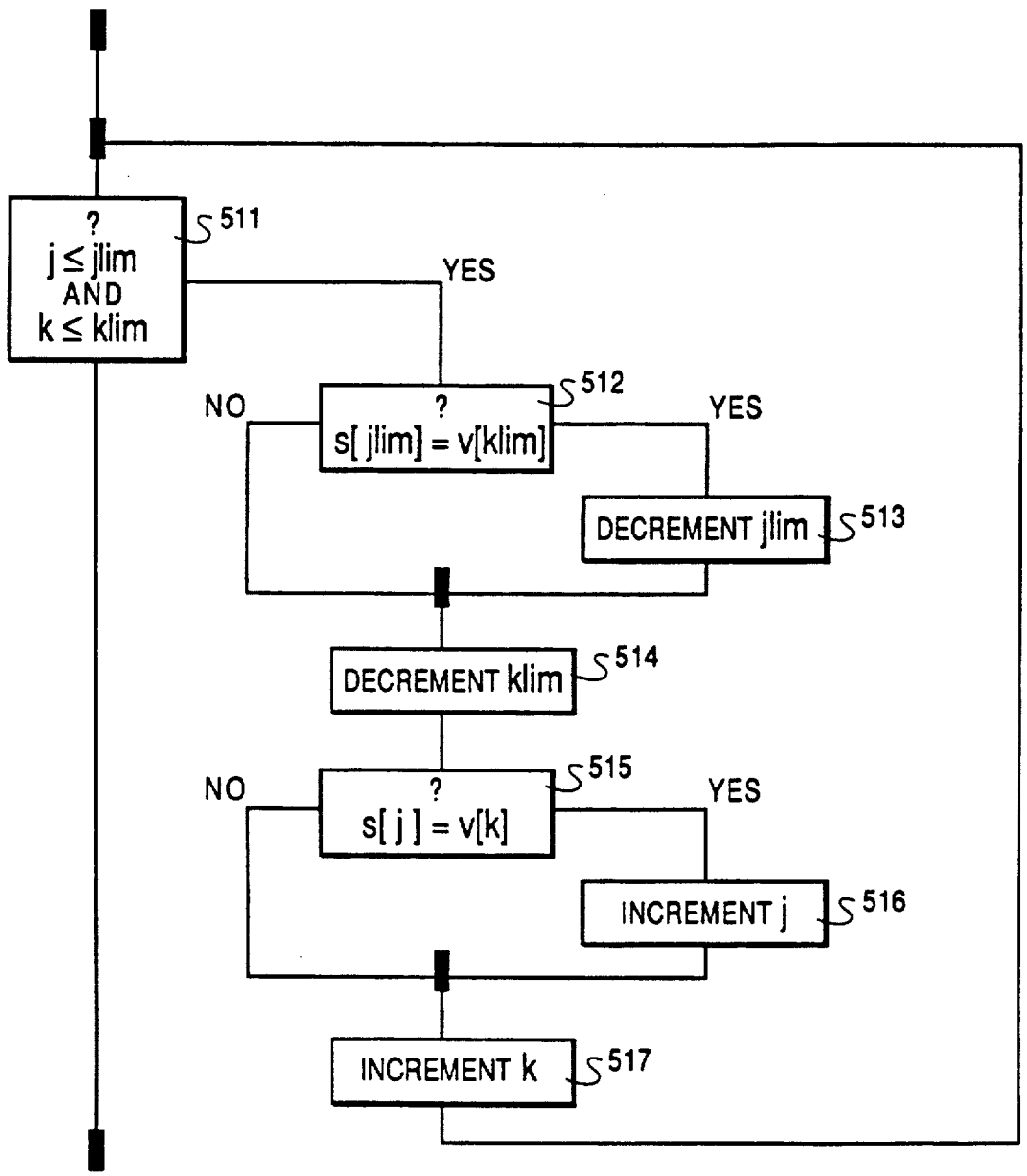
FIG. 5b shows the fast form for rear-emphasis analysis.

Referring to FIGS. 5a and 5b, the fast speed forms of the algorithm are shown. Step 501 determines the extent of operation of loop 502–507. If at step 502 the unreconstructed string character pointed to by j matches the vocabulary string character pointed to by k, then the pointer j is incremented at step 503. At step 504 pointer k is incremented to examine the next character in the vocabulary string. In the reverse direction at steps 505 to 507, if the unreconstructed string character pointed to by jlim matches the vocabulary string character pointed to by klim at step 505, the pointer jlim is decremented at step 506. Klim is decremented at step 507. Note that lastk is not used in the fast speed form. FIG. 5a shows that steps 502-504 precede steps 505-507 for front-emphasis analysis while FIG. 5b shows that steps 505-507 precede steps 502-504 for rear-emphasis analysis.

Referring to FIG. 8, there is shown an algorithm for computing a reconstruction index for both the fast and the normal forms of the method in the front-emphasis mode of operation. At step 801, the algorithm determines whether at least one character in the unreconstructed token has been matched to a character in the vocabulary token. If at least one character has been so matched, at step 802, the difference between j and jlim is compared with the fuzziness factor using the admission function. If this admission function is passed, a reconstruction index for the vocabulary string is computed at steps 803-806. Step 803 sums the pointer distances. To ensure that token reconstruction values fall within the range {0.00 to 1.00}, step 805 calculates the index if jj is greater than kk as determined in step 804 while 806 calculates the index if jj is less than kk.

Figure 6:
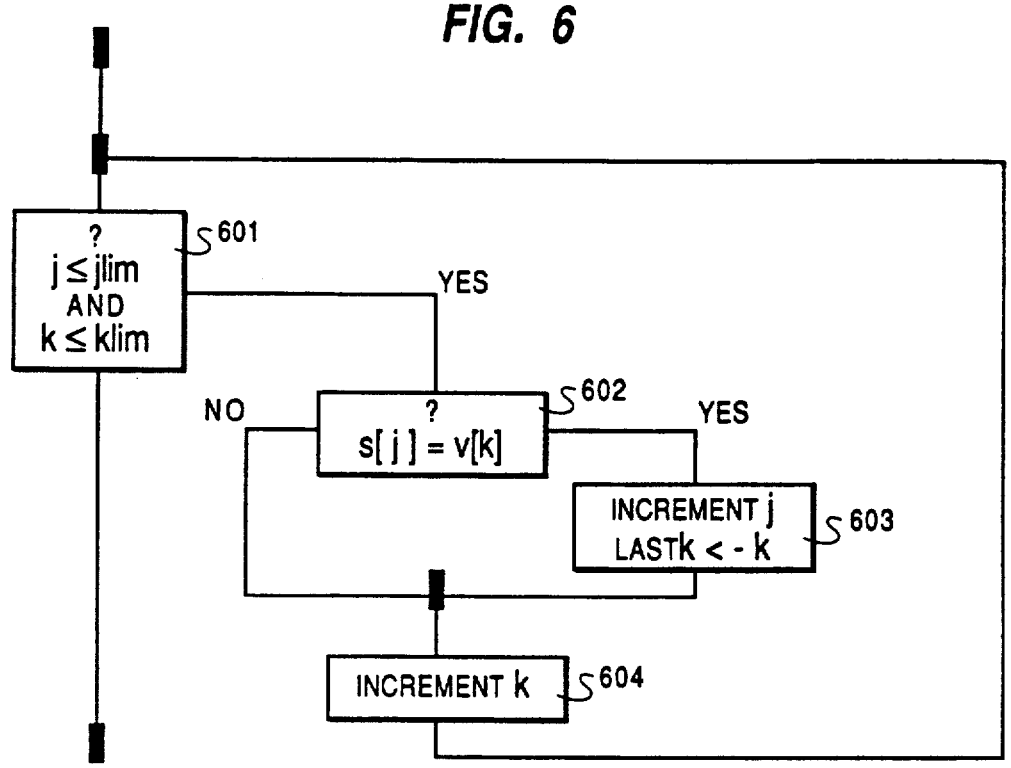
FIG. 6 is a flowchart of the IDA/FCR (beginning-to-end-of-string) algorithm applicable for the normal speed form in the front-emphasis analysis mode of operations.
Figure 7:
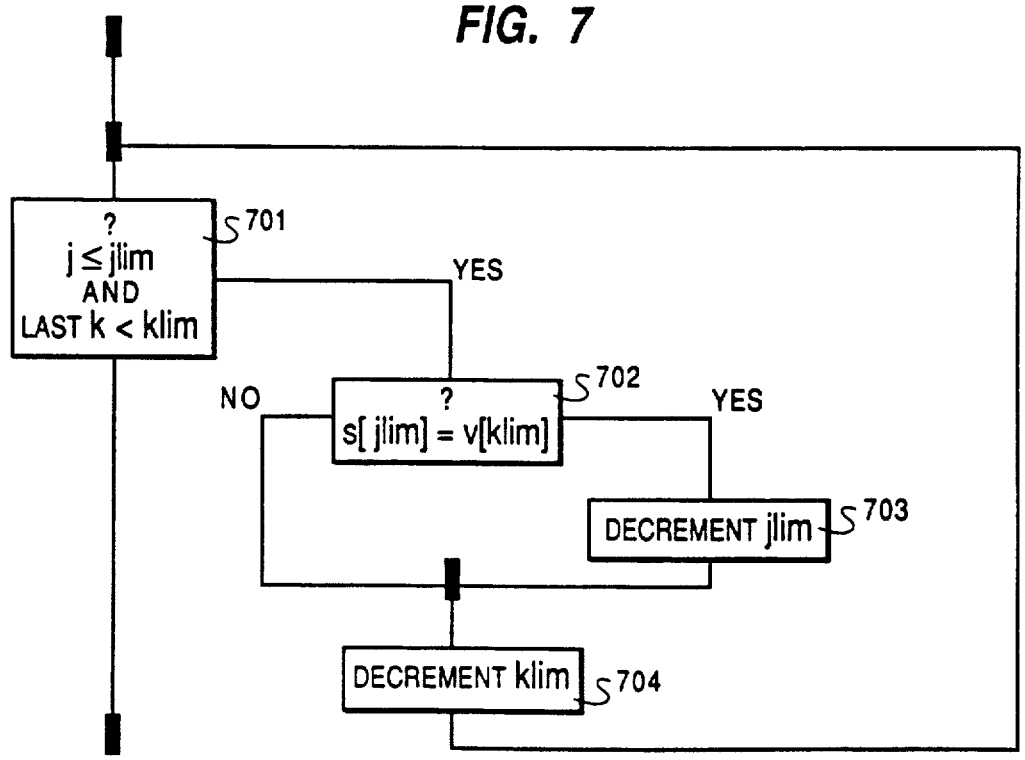
FIG. 7 is a flowchart of the RDA/LCR (end-to-beginning-of-string) algorithm applicable for the normal speed form in the front-emphasis analysis mode.

Referring again to FIG. 3a, the normal speed form in front-emphasis mode of operation is described by FIGS. 4, 6, 7, and 8. FIGS. 6 and 7 together comprise a conditional analysis process where comparisons may be terminated after the IDA if at step 701 certain criteria are met. These criteria may be described as a determination of whether the characters of the unreconstructed string have all been accounted for in the vocabulary string. RDA is unnecessary if all characters or symbols of the unreconstructed fragment are accounted for.

Figure 9:
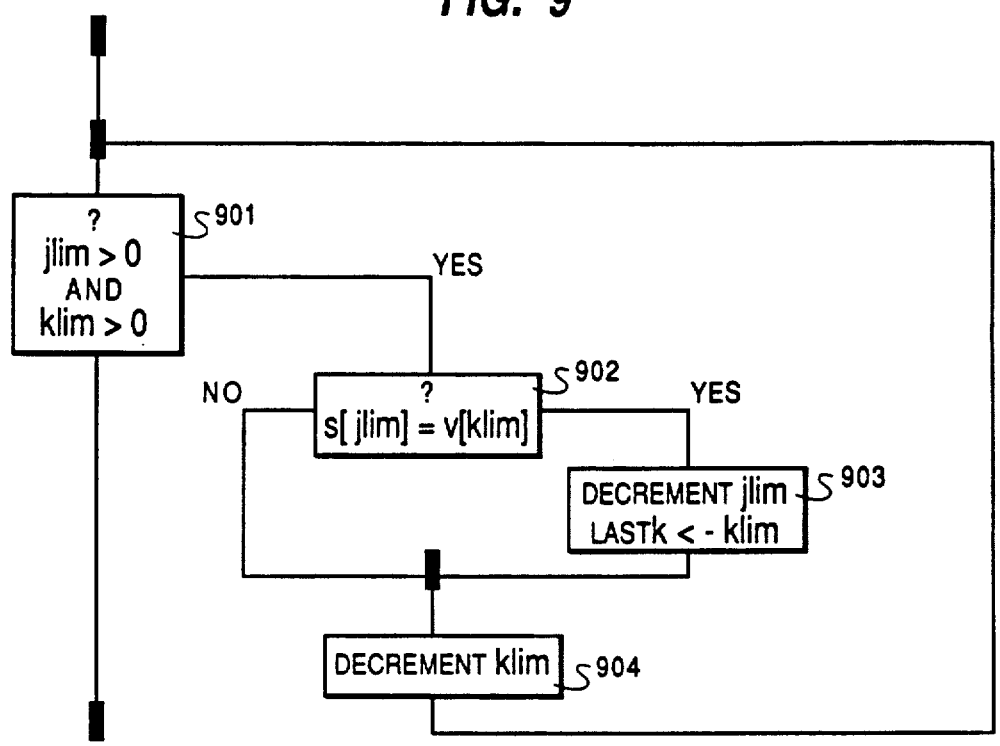
FIG. 9 is a flowchart of the IDA/LCR (end-to-beginning-of-string) algorithm applicable for the normal speed form in the rear-emphasis analysis mode.
Figure 10:
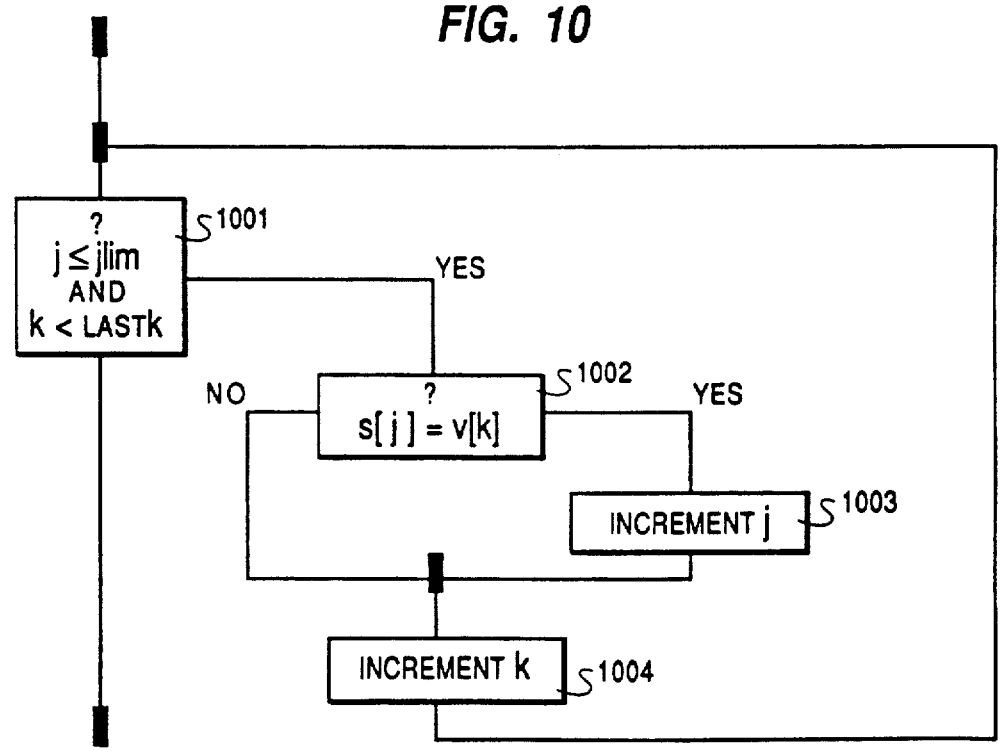
FIG. 10 is a flowchart of the RDA/FCR (beginning-to-end-of-string) algorithm applicable for the normal speed form in the rear-emphasis analysis mode.

Similarly referring to FIG. 3b, FIGS. 9 and 10 together comprise the IDA/LCR and RDA/FCR of a rear-emphasis mode of operation. At the completion of an IDA/LCR at step 1001, analysis may be terminated providing all elements of the unreconstructed string have been accounted for.

Referring again to the normal speed form in front-emphasis mode, in FIGS. 6 and 7, step 601 establishes the duration of operation of the IDA/FCR loop 602 to 604. At step 602, a comparison of the kth character of the vocabulary string is made to the jth character of the unreconstructed string. If there is a match then the pointer j is incremented and lastk is set to the value of pointer k at step 603. At step 604, k is incremented. During execution of the loop, k is incremented until it reaches klim or j reaches jlim, whichever occurs first.

Referring to FIG. 7, step 701 determines whether any iterations of loop 702 through 704 will occur. For each iteration of the loop, at step 702 a comparison of the klimth character of the vocabulary string is made to the jlimth character of the unreconstructed string. If there is a match, the index jlim is decremented at step 703. At step 704, klim is decremented. During execution of the loop, klim is decremented until it reaches lastk or jlim reaches j, whichever occurs first, exhausting either the search or the vocabulary string.

Figure 11:
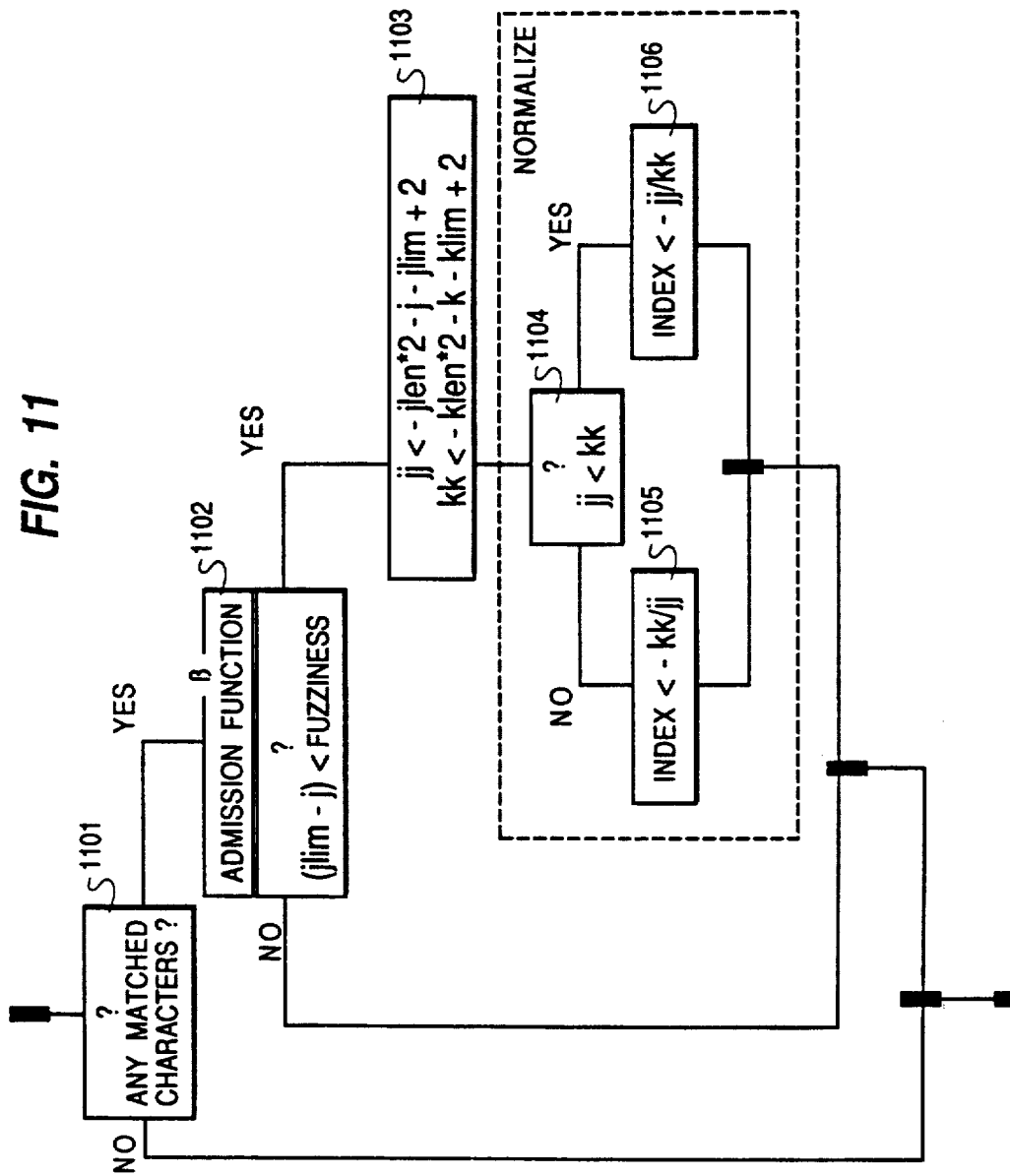
FIG. 11 is a flowchart of a reconstruction index computation applicable for the normal speed form in the rear-emphasis analysis mode.
Figure 12:
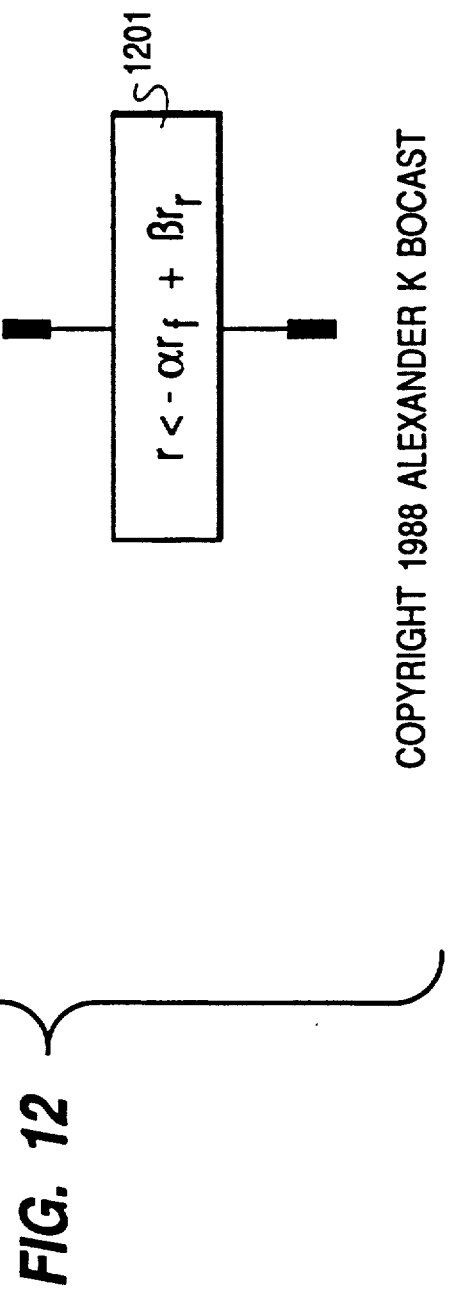
FIG. 12 is a flowchart of a reconstruction index balancing applicable for balanced-emphasis analysis mode.

FIGS. 9 and 10 show normal speed form analysis in a rear-emphasis mode, the result of which is passed to a reconstruction index computation algorithm according to FIG. 11. In this case, the basic reconstruction index function is expressed to capture the pointer distances from the ends of the strings rather than from the beginnings of the strings as in the front-emphasis mode. This function is applied at steps 1103 through 1106 and its basic form is:

$$(jlen*2-j-, jlim+2)/(klen*2-k-klim+2).$$

The calculated reconstruction index is still related to the ratio of the sum of the pointer distances from the rear of the unreconstructed string to the sum of the pointer distances from the rear of the vocabulary string.

Detailed Description of Token Reconstruction Apparatus Parameters

Several parameter determinations have already been described in some detail for controlling the operation of the algorithms depicted in FIGS. 4 through 12, including the fuzziness factor and analysis mode. The following is a brief description of (fuzziness &) autofuzziness, (analysis mode, speed,) acceptance threshold, match constraint, case sensitivity, and unit of analysis controls.

Fuzziness Control

Autofuzziness may be selected by a user or system designer. In this process, the fuzziness factor is first assumed to be zero, i.e., that the unreconstructed string will be analyzed as though it has only undergone one or more arbitrary character deletions. The whole vocabulary is then processed by TRU 10. If no candidate reconstructions are found, the fuzziness factor is incremented by 1. In this manner, vocabulary strings will be evaluated with the assumption that additional errors have been introduced, such as character transposition or the inclusion of an incorrect and/or additional character. If no vocabulary strings are admitted for reconstruction index evaluation, the fuzziness factor is incremented again and again until a vocabulary string with a non-zero reconstruction index is found or the largest fuzziness factor value allowed by an implementation is reached. (Empirically, a fuzziness factor of 7 is the maximum reasonable fuzziness factor value; when the reconstruction index computation is this fuzzy, virtually anything will generate a non-zero reconstruction index.)

Acceptance Threshold

Acceptance threshold relates to the selection of a threshold value which must be exceeded by the value of a vocabulary token's reconstruction index for the vocabulary token to be reported as a potential reconstruction (and output). The disclosed invention is characterized by a reconstruction index that ranges from 0.0 (completely unlikely that the vocabulary string would be a reconstruction of the unreconstructed string) to 1.0 (the unreconstructed token exactly matches the vocabulary token). In one embodiment, the invention returns an ordered list of the most likely reconstructions ordered with respect to their reconstruction indexes. Alternatively, the most likely vocabulary string may be output to a syntactic analyzer or substituted in a message automatically. The method allows a acceptance threshold to be established. All vocabulary tokens with a reconstruction index less than the acceptance threshold will not be included in an output list that rank orders likely candidate reconstructions.

Match Constraint

Match constraint relates to predetermining an initial character match constraint, if desired. Normally, there is no constraint on the admission of vocabulary strings into the set of vocabulary strings to be passed to TRU 10 for reconstruction analysis. However, in certain applications such as command language processing, it has been observed that users seldom make an error typing the first character of an input string. This invention provides for entry of a constraint that requires the first character of the unreconstructed string to match the first character of the vocabulary string to more accurately reflect that application characteristic and to greatly decrease processing time.

Case Sensitivity

Case sensitivity relates to the sensitivity of analysis to the case, upper or lower, of the characters in the strings. Sensitivity to case may be selected from one of three possible entries: none, 7-bit, or alphabetic sensitivity.

With no case sensitivity, alphabetic characters are all translated into the same case before comparison processing. This makes the comparison insensitive to differences in the case of letters. With alphabetic sensitivity, alphabetic characters are not translated, thus making the comparison sensitive to differences in the case of letters.

With 7-bit sensitivity, all characters with byte values in excess of 127 (i.e., between 128 and 255) are mapped into the lower values 0–128 that represent the standard ASCII character set.

Unit of Analysis

Unit of analysis (chunking) is related to defining the set of vocabulary strings. While the token reconstruction algorithm was originally devised to work on individual unreconstructed token fragments and take as the vocabulary individual tokens, it was discovered that the method also applies to a string containing multiple token fragments and to vocabularies comprising strings of words that may be analyzed by subsets of words (a phrase) or analyzed all together as an entire record. This invention provides a means of selecting the unit of analysis that matches the problem most closely:

- by word—the input is treated as a single unreconstructed token fragment and the vocabulary is examined on a word-by-word basis,
- by phrase—the input is treated as one or more unreconstructed token fragments and the vocabulary is examined by looking at phrases marked by user-definable delimiters such as parentheses, or
- by record—the input is treated as one or more unreconstructed token fragments and the vocabulary is examined as strings containing multiple words (tokens).

By way of example, one record might be 'Puerto Rico (a United States possession)' and another 'Rhode Island (a state)'. Each word, each phrase, or an entire record may be analyzed where the unreconstructed string might be 'Poto Riko' or 'Road Iland'.

Consequently, the present invention also meets the requirement of providing flexible control over the analyses performed as well as over the output of the analysis such that the reconstruction analysis may be tailored if desired to the application, allowing design trade-offs between execution speed and accuracy.

Examples of Token Reconstructions

The above-described invention may be further described by way of example where the input unreconstructed string is "super" in normal speed form, front-emphasis analysis mode according to FIGS. 4, 6, 7 and 8. These examples assume that the fuzziness factor is set to one (1).

EXAMPLE 1

"super" vis "super"

A first example for discussion will be the exact equality of the vocabulary string "super" with respect to the unreconstructed string "super". Here, after the IDA/FCR, the distance of pointer j from the beginning of the unreconstructed string will be equal to 6 characters and the pointer jlim will remain at a distance of 5, its initial distance from the beginning of the unreconstructed string. With respect to the vocabulary string, the distance of pointer k from the beginning of the vocabulary string will be equal to 6 characters and the pointer klim will remain at a distance of 5, its initial distance from the beginning of the vocabulary string. The pointer lastk will be at a distance of 5, pointing to the last character matched in the vocabulary string, i.e., the last character of the string. Since j is greater than jlim and k is greater than klim, all characters in both strings have been matched and the RDA/LCR is bypassed. The reconstruction index for the vocabulary string "super" with respect to the unreconstructed string "super" is therefore $(6+5)/(6+5) = 1.0$.

EXAMPLE 2

"supper" vis "super"

A reconstruction analysis of the vocabulary string "supper" with respect to the unreconstructed string "super" will be described in greater detail. In this example, the vocabulary string contains one more character than the unreconstructed string—"super" might have been formed by deleting one 'p' from the word "supper".

At first, the pointer j equals 1 and jlim is equal to jlen, which equals 5, the length in characters of "super". Also the pointer k will be 1 and klim will be 6, the length of "supper". The pointer lastk will be zero.

In the IDA/FCR, since the first character of the unreconstructed string ('s') is equal to the first character of the vocabulary string ('s'), the pointer j is incremented to 2 and lastk is set to k which equals 1. Then index k is incremented to 2.

As the IDA/FCR continues, the characters 'u' and 'p' are readily found in both strings in order as j is incremented to 4, lastk is set to k which now equals 3, and k is incremented to 4. However, now the next character in the unreconstructed string, 'e', is not found to equal 'p', the next character in the vocabulary string. Consequently, neither j nor lastk is changed but k is incremented to 5.

Since now the 'e' of the vocabulary string is found to match the 'e' of the unreconstructed string, j is incremented to 5, lastk is set to 5 which is the current value of k, and k is then incremented to 6. Finally, the final 'r' characters in both strings are found to match, so that j is incremented to 6, lastk set to k which is now 6, and k is incremented to 7. The RDA/LCR is not required since j is now greater than jlim.

According to the reconstruction index calculation, the reconstruction index equals $(6+5)/(7+6)=0.84$.

EXAMPLE 3

"super" v. "lunch"

Now the reconstruction analysis of the vocabulary string "lunch" with respect to the unreconstructed string "super" will be discussed as a third example. The IDA/FCR will end without having found any match for the initial 's' of the unreconstructed string with any of the characters of the vocabulary string. The pointer j will remains at 1 and jlim will still equal 5, the length in characters of "super"; lastk will still be zero, k will be 6, and klim will be 5, the length in characters of "lunch".

At the end of the RDA/LCR, the pointer j will still be 1 and jlim will remain at 5; lastk will have remained at zero while klim will have been decremented to zero as well. Pointer K will equal 6, as before. The RDA/LCR will find no match for the terminal 'r' of the unreconstructed string within the vocabulary string. Since jlim is farther from the origin of the unreconstructed string than is j, "lunch" is not passed to the evaluation algorithm as a candidate reconstruction. Because none of the characters in "super" were matched during the scanning process, no matter what the setting of the fuzziness factor, a non-zero reconstruction index will not be calculated for this vocabulary token. The number of character comparisons in this worst case scenario is 2 times the number of characters or symbols in the vocabulary string "lunch", that is, for this word, ten.

EXAMPLE 4

"duper" vis "super"

The fourth example discussed will consider the vocabulary string "duper" with respect to "super", an unreconstructed string created by mistyping. At the end of IDA/FCR, the pointer j is equal to 1 and jlim equals 5; lastk equals zero, klim equals 5, and k equals 6. The IDA will have found no match for the initial 's' of the unreconstructed string within the vocabulary string.

On the other hand, in the RDA/LCR, character matches are found. At the end of the RDA, the pointers j and jlim will both equal 1; lastk will be zero, klim will equal 1, and k will equal 6. Since jlim equals j, "duper" is a candidate reconstruction. The reconstruction index for "duper" with respect to "super" is $(1+1)/(6+1)=0.28$. Note that front-emphasis is placed on matching characters at the beginning of the vocabulary string; this emphasis leads to the relatively low reconstruction index. The reconstruction index computed in rear-emphasis mode, where character matches at the opposite end of the vocabulary string would be emphasized, would be considerably higher.

EXAMPLE 5

"super" v. "superstition"

The fifth example will be the vocabulary string "superstition" analyzed with respect to the unreconstructed string "super", a truncation that forms an arbitrary abbreviation of "superstition". At the end of the IDA/FCR, the pointer j will equal 6 and jlim will equal 5; lastk will equal 5, k will equal 6, and klim will equal 12. Since j is greater than jlim, RDA/LCR will be bypassed and the reconstruction index will simply equal $(6+5)/(6+12)=0.61$.

All of the above examples assume a fuzziness factor of one (1), in other words, all the example vocabulary strings are given non-zero reconstruction indexes, except "lunch" which would never be given a non-zero evaluation with respect to the unreconstructed string "super".

EXAMPLE 6 autofuzziness

Now the sixth example for discussion will be demonstrate how the fuzziness factor is involved in the evaluation and admission of reconstruction candidates. Presented are three summary token reconstruction evaluations, with the results of the admission function shown for different fuzziness factor values.

Example 1: Is "SUPER" a reconstruction of "SPR"?
IDA:
  S>S
  P>UP
  R>ER j=4, jlim=3, lastk=5
RDA: not required → Level 0: ((3-4)<0) = TRUE :: admitted
Level 1: ((3-4)<1) = TRUE :: admitted
Level 2: ((3-4)<2) = TRUE :: admitted Example 2 Is "SUPER" a reconstruction of "SUPPER"?
IDA:
  S>S
  U>U
  P>P
  P>ER j=4, jlim=6, lastk=3
RDA:
  R>R
  E>E j=4=jlim=4

→ Level 0: ((4-4)<0) = FALSE :: rejected
Level 1: ((4-4)<1) = TRUE :: admitted
Level 2: ((4-4)<2) = TRUE :: admitted Example 3: Is "SUPER" a reconstruction of "SUYRE"?
IDA:
  S>S
  U>U
  Y>PER j=3, jlim=6, lastk=2
RDA:
  E>RE
  R>Y j=3, jlim=4

→ Level 0: ((4-3)<0) = FALSE :: rejected
Level 1: ((4-3)<1) = FALSE :: rejected
Level 2: ((4-3)<2) = TRUE :: admitted Taking the above examples and comparing reconstruction indexes, sorting the output of TRU 10 and associating the reconstruction indexes with their vocabulary words would give the following list:

| SUPER with | SUPER | 1.00 |
|---|---|---|
| | SUPPER | 0.84 |
| | SUPERSTITION | 0.61 |

| -continued | |
|---|---|
| DUPER | 0.28 |
| with LUNCH begin rejected. | |

This ordering agrees with human intuition, assuming a front-emphasis analysis mode using the normal speed form.

To assist one of ordinary skill in the art to practice the present invention, a microfiche appendix is provided containing:

1. A source code listing for the Token Reconstruction Unit (TRU) of the present invention in Pascal and in 80×86 Assembler comprises seven frames.

2. An ASCII text file containing the source code for a demonstration program comprises twenty-five frames.

3. An ASCII text file containing the command language for the demonstration program comprises one frame.

4. An ASCII text file containing the source code for the Assembler component of the demonstration program comprises four frames.

All of these are heavily commented to assist one to an understanding of the present invention. Copyright protection for each of these is asserted in the name of the inventor.

I claim:

1. In a data processing system wherein messages comprising tokens, or strings of characters, may be corrupted into fragments which must be reconstructed into the original tokens, a method of reconstructing an original token from an input string containing at least one unreconstructed token consisting of at least one character, a character being at least one symbol for a letter, a numeral, a punctuation element, or other element of a token, the unreconstructed token having a first end and second end, the method comprising the steps of iteratively calculating and recording at least two indices for the unreconstructed token and at least two indices for a comparison vocabulary string having at least one character, the vocabulary string having a first end and a second end, the iterative calculation involving comparisons of characters in the unreconstructed token with characters in the vocabulary string, at least one of the indices serving both to point to a character of the unreconstructed token for comparison with a character of the vocabulary string and to indicate a position within the unreconstructed token from either the first end or the second end of the unreconstructed token, the position being determined by a series of successful character comparisons, a successful character comparison occurring when a character in the unreconstructed token matches a character in the vocabulary string, the at least one index being revised upon each successful character comparison, whereby a measure of likelihood that the vocabulary string is a reconstruction of the original token is determined.

2. A method of token reconstruction according to claim 1 wherein a first iterative calculating and recording step is performed with respect to the first end of the unreconstructed token and the first end of the vocabulary string, comparing in order characters of the vocabulary string to characters of the unreconstructed token, the calculating and recording step being terminated if all the characters of the unreconstructed token are successfully compared to characters of the vocabulary string or all characters of the vocabulary string have been compared with the characters of the unreconstructed token.

3. A method of token reconstruction according to claim 2 wherein a second iterative calculating and recording step is performed with respect to the second end of the unreconstructed token and the second end of the vocabulary string, comparing in order characters of the vocabulary string to characters of the unreconstructed token if all the characters of the unreconstructed token were not successfully compared to characters of the vocabulary string during the first iterative calculating and recording step of claim 2, the second calculating and recording step being terminated if all the characters of the unreconstructed token not successfully compared in the first iteration calculating and recording step are successfully compared to characters of the vocabulary string or all characters of the vocabulary string have been compared up to but not including the character in the position of the last character successfully compared in the vocabulary string of the first iterative calculating and recording step.

4. A method of token reconstruction according to claim 3, wherein no character of the unreconstructed token compared in the first iterative calculation and recording step with respect to the first end of the unreconstructed string and the first end of the vocabulary string is compared again in the second iterative calculation and recording step with respect to the second end of the unreconstructed string and the second end of the vocabulary string.

5. A method of token reconstruction according to claim 4 wherein the first end of both the unreconstructed token and the vocabulary string used for the first iterative calculating and recording step is the front end and the second end of both the unreconstructed token and the vocabulary string used for the second iterative calculating and recording step is the rear end.

6. A method of token reconstruction according to claim 4 wherein the first end of both the unreconstructed token and the vocabulary string used for the first iterative calculating and recording step is the rear end and the second end of both the unreconstructed token and the vocabulary string used for the second iterative calculating and recording step is the front end.

7. A method of token reconstruction according to claim 3 having a balanced-emphasis analysis mode of operation further comprising the steps of sequentially performing the first and second iterative steps, beginning with respect to the first end of the unreconstructed token and the vocabulary string and calculating and recording at least four indices and calculating a first reconstruction ratio, and then repeating the first and second iterative steps, beginning with respect to the second end of the unreconstructed token and the vocabulary string, calculating and recording at least four additional indices, and calculating a second reconstruction ratio.

8. A method of token reconstruction according to claim 7 wherein the first and second reconstruction ratios are combined to form a composite reconstruction ratio.

9. A method of token reconstruction according to claim 2 wherein at least one pointer index records the position of the last character successfully compared in the vocabulary string.

10. A method of token reconstruction according to claim 1 wherein no more than two indices are iteratively calculated and recorded for the vocabulary string.

11. A method of token reconstruction according to claim 10 wherein the first and second iterative calculating and recording steps are combined into one iterative calculating and recording step, so that the character comparisons occur concurrently from both the first end and the second end of both the unreconstructed token and the vocabulary string, the iterative calculating and recording of indices terminating when all characters in the unreconstructed token have been successfully compared or all characters in the vocabulary string have been compared to characters of the unreconstructed token.

12. A method of token reconstruction according to claim 11 wherein the first and second iterative calculating steps are concurrently performed so that the first iterative calculating and recording step compares a character from the first end of both the unreconstructed token and the vocabulary string, the first end of both the reconstructed token and the vocabulary string being the front end and the second iterative calculating and recording step compares a character from the second end of both the unreconstructed token and the vocabulary string, the second end of both the unreconstructed token and the vocabulary string being the rear end.

13. A method of token reconstruction according to claim 11 wherein the first and second iterative calculating steps are concurrently performed so that the first iterative calculating and recording step compares a character from the first end of both the unreconstructed token and the vocabulary string, the first end of both unreconstructed and the vocabulary string being the rear end, and the second iterative calculating and recording step compares a character from the second end of both the unreconstructed token and the vocabulary string, the second end of both the unreconstructed token and the vocabulary string being the front end.

14. A method of token reconstruction according to claim 1 further comprising the step of calculating a reconstruction ratio for the vocabulary string if the difference between the at least two indices for the unreconstructed token is less than an input integer value fuzziness factor.

15. A method of token reconstruction according to claim 14 comprising the additional step of calculating a reconstruction ratio for the vocabulary string with respect to the unreconstructed token, using at least two indices of the unreconstructed string and two indices of the vocabulary string, the reconstruction ratio being an indication of the relative likelihood that the vocabulary string is a correct reconstruction of the unreconstructed token.

16. A method of token reconstruction according to claim 15 wherein the calculation of the reconstruction ratio comprises the steps of calculating a first sum comprising the at least two indices for the unreconstructed token, calculating a second sum comprising the at least two indices for the vocabulary string, and calculating the ratio of the first sum and the second sum.

17. A method of token reconstruction according to claim 16 wherein the indices are calculated with respect to the front end of the unreconstructed token and the vocabulary string.

18. A method of token reconstruction according to claim 16 wherein the indices are calculated with respect to the rear end of the unreconstructed token and the vocabulary string.

19. In a data processing system wherein messages comprising tokens, or strings of characters, may be corrupted into fragments which must be reconstructed into the original tokens, a method of reconstructing an original token from an input string containing at least one unreconstructed token consisting of at least one character, a character being at least one symbol for a letter in upper case or lower case, a numeral, a punctuation element, or other element of a token the method comprising the steps of iteratively calculating and recording at least two indices for the unreconstructed token based on comparison with a vocabulary string of at least one character, the iterative calculation involving comparisons of characters in the unreconstructed token with characters in the vocabulary string, the at least two indices being revised for a successful character comparison, a successful character comparison being when a character of the unreconstructed token matches a character in the vocabulary string, and calculating a reconstruction ratio for the vocabulary string if the difference between the at least two indices for the unreconstructed token is less than an input integer fuzziness factor, the reconstruction ratio being and indication of the relative likelihood that a vocabulary string is a correct reconstruction of the unreconstructed token.

20. A method of token reconstruction according to claim 19 comprising the additional step of incrementing the fuzziness factor from zero until the difference between the at least two indices for the unreconstructed token is less than the incremented value of the fuzziness factor and at least one vocabulary string has a non-zero reconstruction ratio.

21. A method of token reconstruction according to claim 19 comprising the additional step of sorting all vocabulary strings having non-zero reconstruction ratios by their reconstruction ratios only if their respective reconstruction ratios are greater than a predetermined acceptance threshold and less than the input fuzziness factor.

* * * * *